(12) United States Patent
Jia

(10) Patent No.: US 10,750,073 B2
(45) Date of Patent: Aug. 18, 2020

(54) ELECTRONIC DEVICE AND PHOTOGRAPHING CONTROL METHOD THEREOF

(71) Applicant: GUANGDONG OPPO MOBILE TELECOMMUNICATIONS CORP., LTD., Dongguan, Guangdong (CN)

(72) Inventor: Yuhu Jia, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 16/367,242

(22) Filed: Mar. 28, 2019

(65) Prior Publication Data
US 2019/0373151 A1 Dec. 5, 2019

(30) Foreign Application Priority Data

May 30, 2018 (CN) .......................... 2018 1 0541410
May 30, 2018 (CN) ...................... 2018 2 0831759 U

(51) Int. Cl.
*H04N 5/232* (2006.01)
*H04N 5/225* (2006.01)
*H04M 1/02* (2006.01)

(52) U.S. Cl.
CPC ........ *H04N 5/2257* (2013.01); *H04M 1/0266* (2013.01); *H04N 5/23293* (2013.01)

(58) Field of Classification Search
CPC .... H04N 5/378; H04N 5/374; H01L 51/4246; H01L 27/307; H01L 51/0046
See application file for complete search history.

(56) References Cited

U.S. PATENT DOCUMENTS

| 7,440,265 B2 * | 10/2008 | Ou Yang | ............... G06F 1/1601 |
| | | | 348/375 |
| 10,264,184 B2 * | 4/2019 | Yamazaki | ............. G06F 1/1652 |
| 2006/0061555 A1 | 3/2006 | Mullen | |

(Continued)

FOREIGN PATENT DOCUMENTS

| CN | 106843398 | 6/2017 |
| CN | 106878564 | 6/2017 |

(Continued)

OTHER PUBLICATIONS

WIPO, English Translation of ISR/WO for PCT/CN2019/083102, dated Jul. 2, 2019.

(Continued)

*Primary Examiner* — Hung H Lam
(74) *Attorney, Agent, or Firm* — Hodgson Russ LLP

(57) ABSTRACT

An electronic device and a photographing control method thereof are provided. The electronic device includes: a housing; a camera provided in the housing; a display screen movably assembled to the housing, and switchable between a first state and a second state with respect to the housing. The display screen has a display portion and a non-display portion, and the non-display portion is light transparent. When the display screen is in the first state, the camera is covered by the display portion. When the display screen is in the second state, the camera faces to the non-display portion, and configured to collect light through the non-display portion and performs imaging.

20 Claims, 15 Drawing Sheets

(56) References Cited

U.S. PATENT DOCUMENTS

| | | | |
|---|---|---|---|
| 2009/0298537 A1 | 12/2009 | Choi | |
| 2015/0062175 A1* | 3/2015 | Kim | G09G 3/3648 345/639 |
| 2015/0141074 A1 | 5/2015 | Shim et al. | |
| 2017/0235398 A1 | 8/2017 | Choi et al. | |
| 2018/0213071 A1* | 7/2018 | Bao | G06F 3/041 |
| 2018/0357952 A1* | 12/2018 | Yang | H01L 27/326 |

FOREIGN PATENT DOCUMENTS

| | | |
|---|---|---|
| CN | 106920470 | 7/2017 |
| CN | 107229372 | 10/2017 |
| CN | 107295127 | 10/2017 |
| CN | 108881528 | 11/2018 |
| EP | 3203817 | 8/2017 |

OTHER PUBLICATIONS

EPO, Office Action for EP Application No. 19169919.8, dated Oct. 16, 2019.

\* cited by examiner

ELECTRONIC DEVICE AND PHOTOGRAPHING CONTROL METHOD THEREOF

CROSS REFERENCE TO RELATED APPLICATION

The present application claims priority to Chinese Application No. 201810541410.5, filed May 30, 2018, and Chinese Application No. 201820831759.8, filed May 30, 2018. The entire disclosures of the aforementioned applications are incorporated herein by reference.

FIELD

The present disclosure relates to a technical field of communication equipment, and more particularly, to an electronic device and a photographing control method thereof.

BACKGROUND

In the related art, an electronic device, such as a mobile phone, a tablet computer, a notebook computer, and a smart television, is provided with a camera in a display panel of the electronic device to meet a user's need of taking selfies. In order to realize a photographing function of the camera, the camera has to be spaced apart from a display screen of the display panel. Such an arrangement may, however, cause the camera to occupy a part of a display area of the display screen, thereby resulting in a relatively low screen-to-body ratio (a ratio of an area of a display portion of the display panel to an area of the display panel) of the electronic device.

SUMMARY

Embodiments of a first aspect of the present disclosure provide an electronic device. The electronic device includes: a housing; a camera provided in the housing; and a display screen movably assembled to the housing, and switchable between a first state and a second state with respect to the housing, the display screen having a display portion and a light-transparent non-display portion. When the display screen is in the first state, the camera is covered by the display portion, and when the display screen is in the second state, the camera faces to the non-display portion, and configured to collect light through the non-display portion and performs imaging.

Embodiments of a second aspect of the present disclosure provide a photographing control method of the above electronic device. The photographing control method according to embodiments of the present application includes: receiving a photographing preview instruction, the photographing preview instruction being configured to trigger the electronic device to control the display screen to switch from the first state to the second state and to trigger the camera to turn on image preview; and receiving a photographing instruction, the photographing instruction being configured to trigger the camera to collect light through the non-display portion of the display screen and perform imaging.

Embodiments of a third aspect of the present disclosure provide another electronic device. The electronic device includes: a housing; a display screen disposed to the housing, movable with respect to the housing and capable of being switched between a first state and a second state, the display screen having a display portion and a light-transparent non-display portion; and a camera arranged between the housing and the display screen, and configured to be covered by the display portion when the display screen is in the first state and to face to the light-transparent non-display portion when the display screen is in the second state, and the camera being further configured to collect light through the light-transparent non-display portion and perform imaging when the display screen is in the second state.

Additional aspects and advantages of embodiments of present disclosure will be given in part in the following descriptions, become apparent in part from the following descriptions, or be learned from the practice of the embodiments of the present application.

BRIEF DESCRIPTION OF THE DRAWINGS

These and/or other aspects and advantages of embodiments of the present disclosure will become apparent and more readily appreciated from the following descriptions made with reference to the drawings.

DETAILED DESCRIPTION

Figure 1:
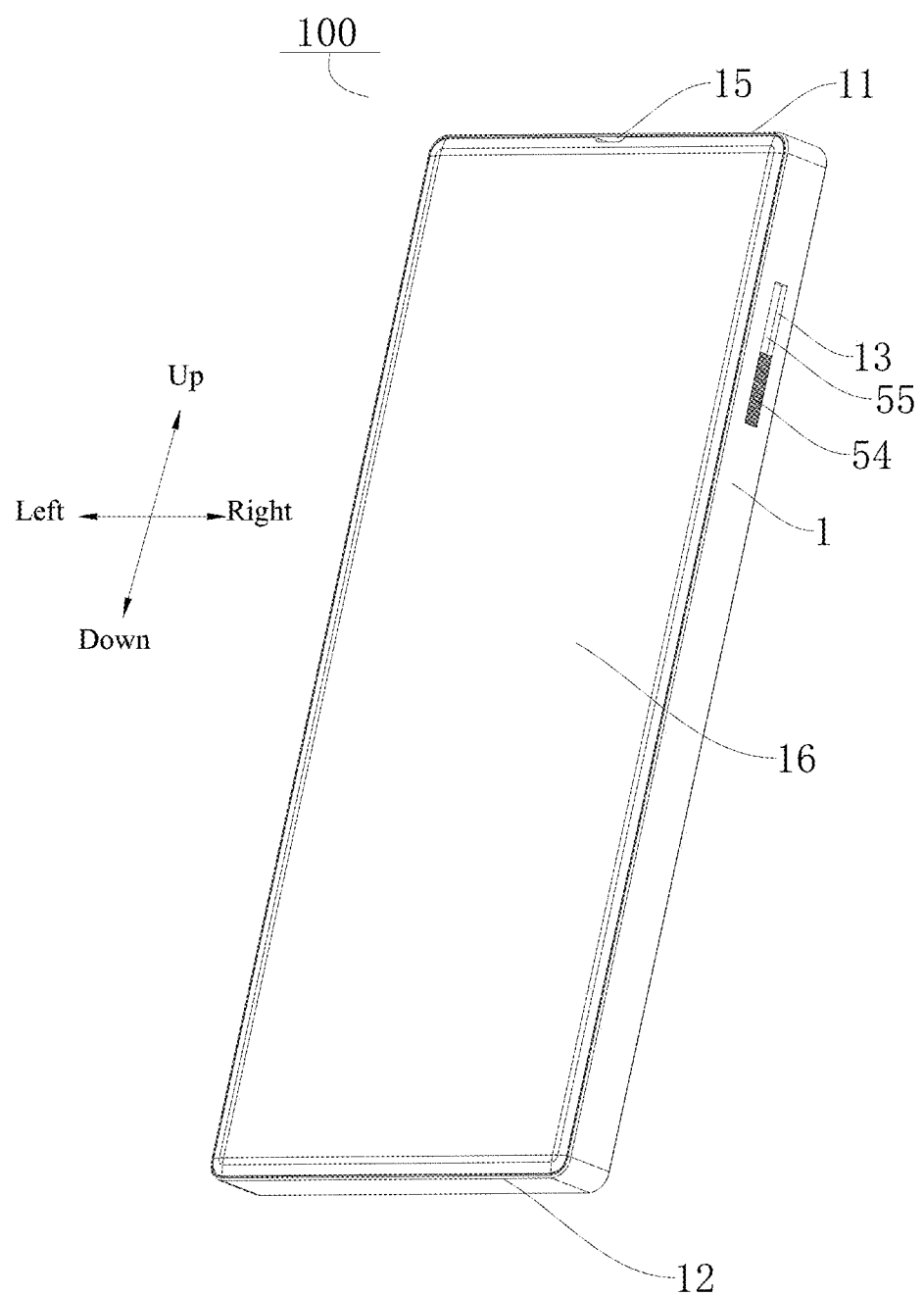
FIG. 1 illustrates a perspective view of an electronic device according to an embodiment of the present disclosure.

Embodiments of the present disclosure will be described in detail and examples of the embodiments will be illustrated in the accompanying drawings. The same or similar elements and the elements having same or similar functions are denoted by like reference numerals throughout the descriptions. The embodiments described herein with reference to the drawings are explanatory, which aim to illustrate the present disclosure, but shall not be construed to limit the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation as then described or as shown in the drawings under discussion. These relative terms are for convenience of description and do not require that the present invention have a particular orientation or be constructed and operated in a particular orientation. Thus, these relative terms shall not be constructed to limit the present disclosure. In addition, terms such as "first" and "second" may explicitly or implicitly comprise one or more of this feature. In the description of the present disclosure, "a plurality of" means two or more than two, unless specified otherwise.

In the present invention, it should be noted that, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Embodiments of the present disclosure provide an electronic device. The electronic device includes: a housing; a camera provided in the housing; and a display screen movably assembled to the housing, and switchable between a first state and a second state with respect to the housing, the display screen having a display portion and a light-transparent non-display portion. When the display screen is in the first state, the camera is covered by the display portion, and when the display screen is in the second state, the camera faces to the non-display portion, and configured to collect light through the non-display portion and performs imaging.

Embodiments of the present disclosure provide a photographing control method of the above electronic device. The photographing control method according to embodiments of the present application includes: receiving a photographing preview instruction, the photographing preview instruction being configured to trigger the electronic device to control the display screen to switch from the first state to the second state and to trigger the camera to turn on image preview; and receiving a photographing instruction, the photographing instruction being configured to trigger the camera to collect light through the non-display portion of the display screen and perform imaging.

Embodiments of the present disclosure provide another electronic device. The electronic device includes: a housing; a display screen disposed to the housing, movable with respect to the housing and capable of being switched between a first state and a second state, the display screen having a display portion and a light-transparent non-display portion; and a camera arranged between the housing and the display screen, and configured to be covered by the display portion when the display screen is in the first state and to face to the light-transparent non-display portion when the display screen is in the second state, and the camera being further configured to collect light through the light-transparent non-display portion and perform imaging when the display screen is in the second state.

An electronic device 100 according to embodiments of the present disclosure will be described with reference to FIGS. 1-25.

As illustrated in FIGS. 1-4, the electronic device 100 according to embodiments of the present disclosure includes a housing 1, a camera 2 and a display screen 3.

Figure 3:
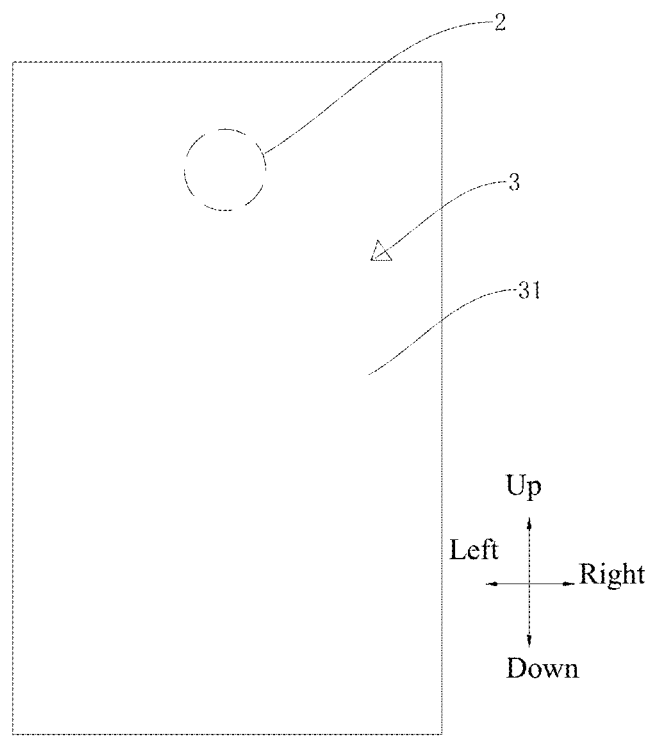
FIG. 3 illustrates a front view of a display screen of an electronic device according to an embodiment of the present disclosure, in which the display screen is in a first state.
Figure 4:
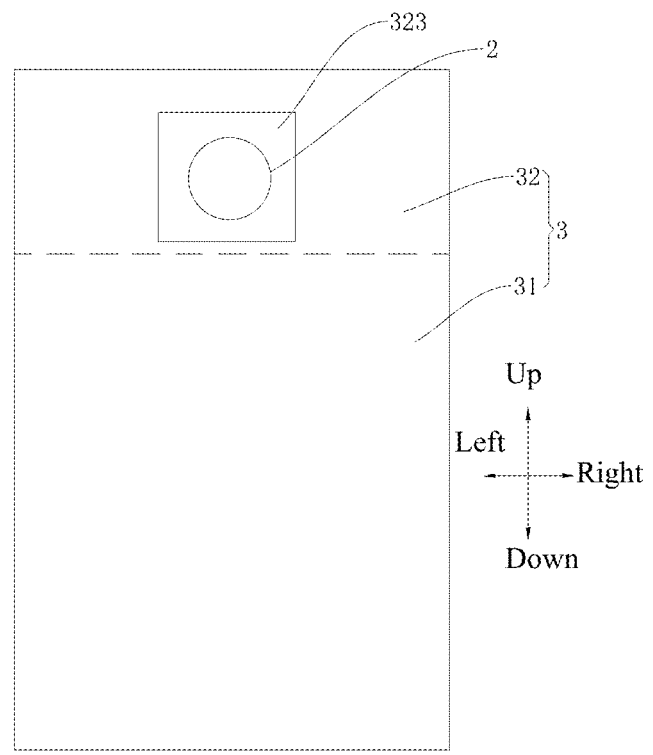
FIG. 4 illustrates a front view of a display screen of an electronic device according to an embodiment of the present disclosure, in which the display screen is in a second state.

In embodiments of the present disclosure, the camera 2 is provided in the housing 1, the display screen 3 is movably assembled to the housing 1, and the camera 2 is provided between the housing 1 and the display screen 3, such that the electronic device 100 can have an increased screen-to-body ratio. As illustrated in FIGS. 3 and 4, the display screen 3 has a display portion 31 and a light-transparent non-display portion 32. The display portion 31 may have pixels and be configured to display an image to be displayed by the electronic device 100. The non-display portion 32 may not be provided with any pixel and may not display any image.

The display screen 3 is switchable between a first state and a second state with respect to the housing 1. As illustrated in FIG. 3, when the display screen 3 is in the first state, the camera 2 faces to the display portion 31 and is covered by the display portion 31, the display portion 31 faces to a display region of the electronic device 100, and the electronic device 100 can perform the full-screen display. As illustrated in FIG. 4, when the display screen 3 is in the second state, the camera 2 faces to the non-display portion 32 and can collect light through the non-display portion 32 and perform imaging. Light at a side of the display screen 3 away from the camera 2 can enter the camera 2 through the non-display portion 32, and hence the camera 2 can take photos.

When the camera 2 is in a working state, the display screen 3 can be switched to the second state, and the light at the side of the display screen 3 away from the camera 2 can enter the camera 2 through the non-display portion 32, thereby guaranteeing the photographing quality of the camera 2. When the camera 2 is in a non-working state, the display screen 3 can be switched to the first state, such that the camera 2 faces to the display portion 31 and is blocked by the display portion 31 of the display screen 3, the display portion 31 faces to the display region of the electronic device 100, and the electronic device 100 can perform the full-screen display, thereby upgrading the user experience. In addition, the side of the display screen 3 away from the housing 1 is provided with a cover plate 16, and the cover plate 16 can protect the display screen 3. In some embodiments of the present disclosure, at least a part of the cover plate 16 is light transparent.

For the electronic device 100 according to the embodiments of the present disclosure, by providing the camera 2 in the housing 1 and positioning the display screen 3 at a side of the camera 2 away from the housing 1, a space of the display screen 3 occupied by the camera 2 can be reduced, such that the screen-to-body ratio of the electronic device 100 can be increased, and hence the full-screen display can be realized. Additionally, the display screen 3 is switchable between the first state and the second state. When the display screen 3 is in the first state, the camera 2 faces to the display portion 31 and the display portion 31 faces to the display region of the electronic device 100, such that the electronic device 100 can perform the full-screen display, thereby improving a display effect of the electronic device 100. When the display screen 3 is in the second state, the camera 2 faces to the non-display portion 32, and the camera 2 can receive the light at the side of the display screen 3 away from the camera 2, thereby guaranteeing the photographing quality of the camera 2.

In some embodiments of the present disclosure, the non-display portion 32 is a transparent portion, thereby ensuring that the light at the side of the display screen 3 away from the camera 2 can enter the camera 2 through this transparent portion, so as to guarantee the photographing quality of the camera 2. The non-display portion 32 may be a substrate of the display screen 3, and it is not necessary to provide any pixel in the non-display portion 32, such that the non-display portion 32 is a transparent portion to ensure the passage of the light. Certainly, the non-display portion 32 may also be a transparent member provided separately, and the transparent member is connected to the display portion 31 by a connecting member.

Further, as illustrated in FIG. 4, the non-display portion 32 has a hole 323, and when the display screen 3 is in the second state, the camera 2 faces to the hole 323. Thus, it can be further ensured that the light at the side of the display screen 3 away from the camera 2 may enter the camera 2 through this hole 323, thereby further improving the photographing quality of the camera 2. The hole 323 may have a section of a circular, oval or polygonal shape. For example, as illustrated in FIG. 4, the shape of the section of the hole 323 is a rectangle.

Figure 5:
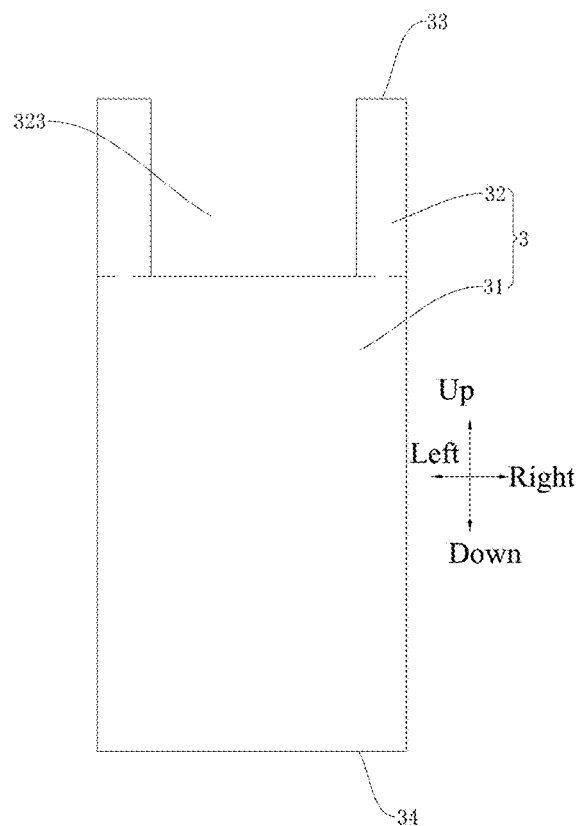
FIG. 5 illustrates a schematic view of a spread display screen of an electronic device according to an embodiment of the present disclosure.
Figure 6:
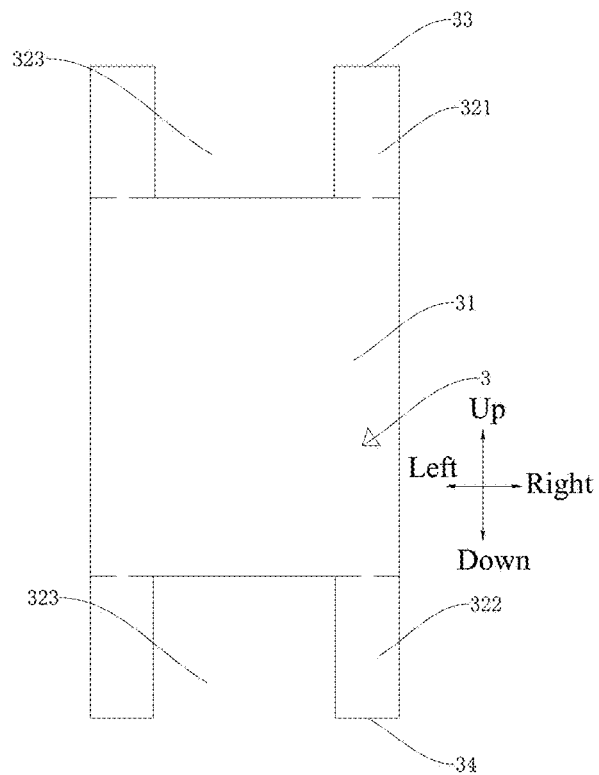
FIG. 6 illustrates a schematic view of a spread display screen of an electronic device according to another embodiment of the present disclosure.
Figure 7:
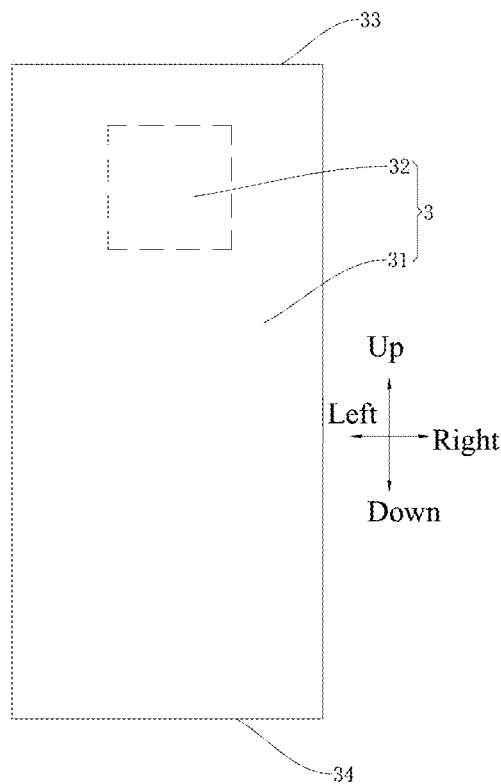
FIG. 7 illustrates a schematic view of a spread display screen of an electronic device according to still another embodiment of the present disclosure.

In some embodiments of the present disclosure, as illustrated in FIGS. 5-7, the display screen 3 has a first end 33 and a second end 34 opposite to each other, and the display screen 3 is movable in a direction from the first end 33 to the second end 34 and in a direction from the second end 34 to the first end 33, such that the display screen 3 is switchable between the first state and the second state. Hence, the movement process of the display screen 3 can be simplified, and the control over the electronic device 100 can be facilitated. For example, when the display screen 3 is a flat screen, the display screen 3 can move along a straight line in a plane where it is located; when the display screen 3 is a curved screen, the display screen 3 can move along a curved line.

In some embodiments of the present disclosure, as illustrated in FIG. 5, in the direction from the first end 33 to the second end 34, the non-display portion 32 and the display portion 31 are arranged in sequence. For example, as illustrated in FIG. 5, the non-display portion 32 is close to the first end 33, while the display portion 31 is close to the second end 34. When the display screen 3 is in the first state, the display screen 3 moves towards the first end 33, and the display portion 31 faces to the display region of the electronic device 100 to perform the display. When the display screen 3 is switched to the second state, the display screen 3 moves towards the second end 34, such that the camera 2 faces to the non-display portion 32 to allow the light at the side of the display screen 3 away from the camera 2 to enter the camera 2 through this light-transparent portion, thereby guaranteeing the photographing quality of the camera 2.

Further, as illustrated in FIG. 5, the non-display portion 32 is provided with the hole 323, and the hole 323 is defined by four edges, two of the four edges face to each other in the moving direction of the display screen 3, and the other two of the four edges face to each other in a direction perpendicular to the moving direction of the display screen 3. The other two of the four edges opposite to each other in the direction perpendicular to the moving direction of the display screen 3 are adjacent to edges of the display screen 3 in the direction perpendicular to the moving direction of the display screen 3, respectively. One of the two of the four edges opposite to each other in the moving direction of the display screen 3, which is close to the display portion 31, extends to an edge of the display portion 31, while the other one of the two of the four edges opposite to each other in the moving direction of the display screen 3, which is away from the display portion 31, extends to an edge of the non-display portion 32 away from the display portion 31.

For example, as illustrated in FIG. 5, a left edge surrounding the hole 323 is close to a left edge of the display screen 3, a right edge surrounding the hole 323 is close to a right edge of the display screen 3, a lower edge surrounding the hole 323 extends to an upper edge of the display portion 31, and an upper edge surrounding the hole 323 extends to an upper edge of the non-display portion 32. Thus, the photographing quality of the camera 2 can be improved, and the material cost of the display screen 3 can be saved.

In some embodiments of the present application, the upper edge surrounding the hole 323 may be omitted, that is, the hole 323 is configured as a notch recessed from the upper edge of the non-display portion 32 to the upper edge of the display portion 31.

In some embodiments of the present disclosure, as illustrated in FIG. 6, the non-display portion 32 includes a first non-display portion 321 and a second non-display portion 322, and in the direction from the first end 33 to the second end 34, the first non-display portion 321, the display portion 31 and the second non-display portion 322 are arranged in sequence. The first non-display portion 321 and the second non-display portion 322 are arranged at the two ends (e.g.

upper and lower ends as illustrated in FIG. 6) of the display screen 3, and the display portion 31 is arranged between the first non-display portion 321 and the second non-display portion 322.

When the display screen 3 is in the first state, the camera 2 faces to the display portion 31, and the display portion 31 faces to the display region of the electronic device 100, such that the full-screen display of the electronic device 100 can be realized. When the display screen 3 is in the second state, the camera 2 faces to one of the first non-display portion 321 and the second non-display portion 322. For example, when the display screen 3 is switched from the first state to the second state, the display screen 3 can move to the first end 33 to make the first non-display portion 321 face to the camera 2, and the display screen 3 can also move to the second end 34 to make the camera 2 face to the second non-display portion 322.

Therefore, by providing the first non-display portion 321 and the second non-display portion 322 and by arranging the first non-display portion 321 and the second non-display portion 322 at the two ends of the display portion 31, the display screen 3 can be adjusted in two directions so as to allow the camera 2 to face to one of the first non-display portion 321 and the second non-display portion 322, such that it is convenient for a user to adjust the camera 2 to face to the non-display portion 32, thereby facilitating the switch of the display screen 3 between the first state and the second state.

Further, as illustrated in FIG. 6, each of the first non-display portion 321 and the second non-display portion 322 is provided with the hole 323. The hole 323 in the first non-display portion 321 is defined by four edges, two of the four edges face to each other in the moving direction of the display screen 3, and the other two of the four edges face to each other in a direction perpendicular to the moving direction of the display screen 3. The other two of the four edges opposite to each other in the direction perpendicular to the moving direction of the display screen 3 are adjacent to edges of the display screen 3 in the direction perpendicular to the moving direction of the display screen 3, respectively. One of the two of the four edges opposite to each other in the moving direction of the display screen 3, which is close to the display portion 31, extends to an edge of the display portion 31, while the other one of the two of the four edges opposite to each other in the moving direction of the display screen 3, which is away from the display portion 31, extends to an edge of the first non-display portion 321 away from the display portion 31.

For example, as illustrated in FIG. 6, a left edge surrounding the hole 323 in the first non-display portion 321 is close to the left edge of the display screen 3, a right edge surrounding the hole 323 in the first non-display portion 321 is close to the right edge of the display screen 3, a lower edge surrounding the hole 323 extends to the upper edge of the display portion 31, and an upper edge surrounding the hole 323 extends to an upper edge of the first non-display portion 321. Thus, the photographing quality of the camera 2 can be improved, and the material cost of the display screen 3 can be saved.

In some embodiments of the present application, the upper edge surrounding the hole 323 may be omitted, that is, the hole 323 is configured as a notch recessed from the upper edge of the first non-display portion 321 to the upper edge of the display portion 31.

The hole 323 in the second non-display portion 322 is defined by four edges, two of the four edges face to each other in the moving direction of the display screen 3, and the other two of the four edges face to each other in a direction perpendicular to the moving direction of the display screen 3. The other two of the four edges opposite to each other in the direction perpendicular to the moving direction of the display screen 3 are adjacent to edges of the display screen 3 in the direction perpendicular to the moving direction of the display screen 3, respectively. One of the two of the four edges opposite to each other in the moving direction of the display screen 3, which is close to the display portion 31, extends to an edge of the display portion 31, while the other one of the two of the four edges opposite to each other in the moving direction of the display screen 3, which is away from the display portion 31, extends to an edge of the second non-display portion 322 away from the display portion 31.

For example, as illustrated in FIG. 6, a left edge surrounding the hole 323 in the second non-display portion 322 is close to the left edge of the display screen 3, a right edge surrounding the hole 323 in the second non-display portion 322 is close to the right edge of the display screen 3, an upper edge surrounding the hole 323 extends to a lower edge of the display portion 31, and a lower edge surrounding the hole 323 extends to a lower edge of the second non-display portion 322. Thus, the photographing quality of the camera 2 can be improved, and the material cost of the display screen 3 can be saved.

In some embodiments of the present application, the lower edge surrounding the hole 323 may be omitted, that is, the hole 323 is configured as a notch recessed from the lower edge of the second non-display portion 322 to the lower edge of the display portion 31.

In some embodiments of the present disclosure, as illustrated in FIG. 7, the display portion 31 surrounds the non-display portion 32, and the non-display portion 32 is close to the first end 33 of the display screen 3. Thus, when the display screen 3 is switched to the second state, since the display portion 31 is provided around the non-display portion 32, a display scale of the display screen 3 can be ensured to the upmost extent in the second state, even if the camera 2 faces to the non-display portion 32, which thus reduces the display scale of the electronic device 100.

Figure 2:
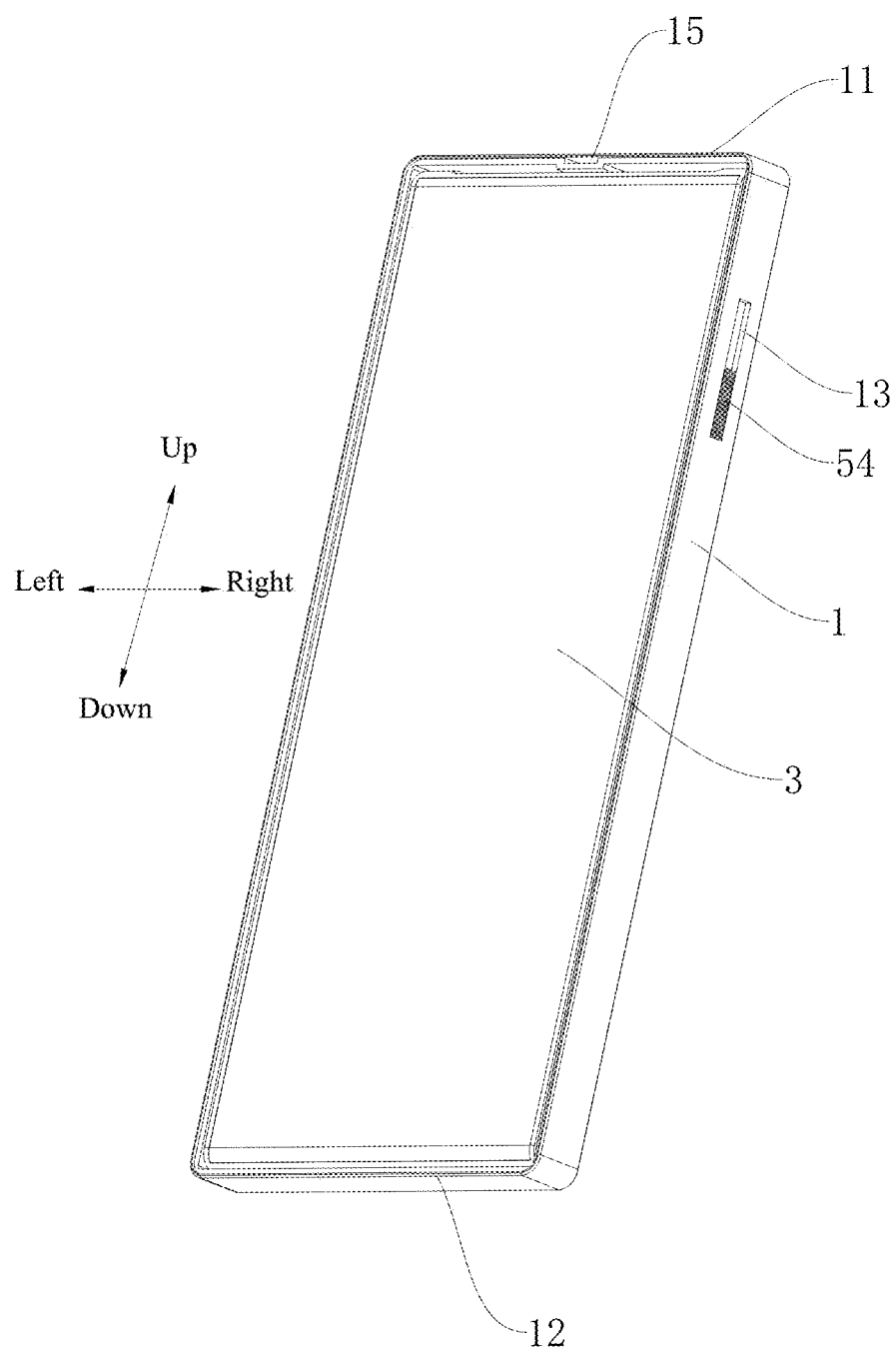
FIG. 2 illustrates a perspective view of an electronic device according to an embodiment of the present disclosure.

In some embodiments of the present disclosure, as illustrated in FIGS. 1 and 2, the housing 1 has a third end 11 and a fourth end 12 opposite to each other. The third end 11 may be one of an upper end and a lower end of the electronic device 100, and the fourth end 12 may be the other one thereof. Alternatively, the third end 11 may be one of a left end and a right end of the electronic device 100, and the fourth end 12 may be the other one thereof. For convenience of description, by way of example, the third end 11 is configured as the upper end of the electronic device 100, and the fourth end 12 is configured as the lower end of the electronic device 100. Those skilled in the art can understand embodiments where the third end 11 and the fourth end 12 are configured as other ends after reading the following descriptions.

Figure 8:
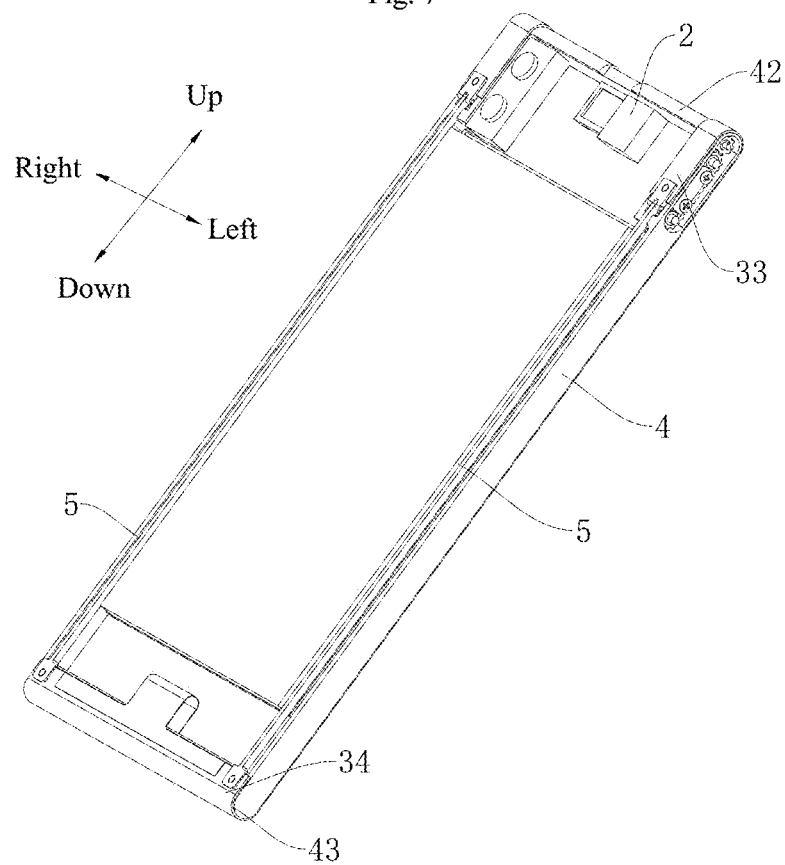
FIG. 8 illustrates a perspective view of a partial structure of an electronic device according to an embodiment of the present disclosure.
Figure 9:
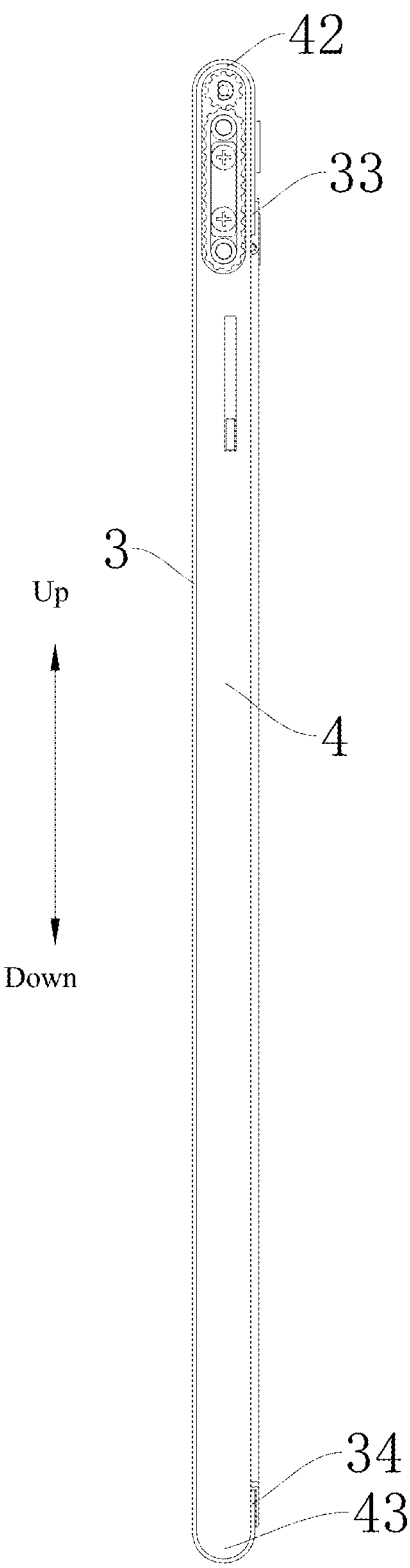
FIG. 9 illustrates a side view of a partial structure of an electronic device according to an embodiment of the present disclosure.
Figure 10:
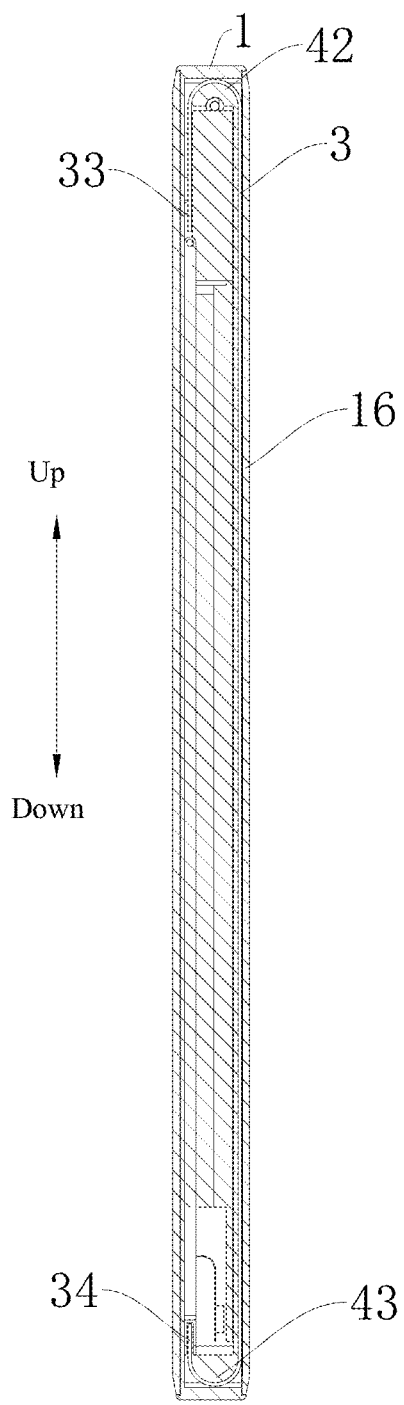
FIG. 10 illustrates a sectional view of an electronic device according to an embodiment of the present disclosure.

As illustrated in FIGS. 8-10, the electronic device 100 further includes a first steering part 42 and a second steering part 43. The first steering part 42 and the second steering part 43 are both provided in the housing 1. The first steering part 42 is located at the third end 11 and the second steering part 43 is located at the fourth end 12 of the housing 1. The first steering part 42 and the second steering part 43 are parallel, the first steering part 42 extends along a width direction of the third end 11 (e.g. a left and right direction as illustrated in FIG. 8), and correspondingly, the second steering part 43 extends along a width direction of the fourth end 12 (e.g. the left and right direction as illustrated in FIG. 8).

As illustrated in FIGS. 8-10, the display screen 3 is a flexible screen, the first end 33 is bent around the first steering part 42 and the second end 34 is bent around the second steering part 43, such that the first end 33 and the second end 34 are connected. Thus, the display screen 3 may be configured in a ring shape, such that when the display screen 3 moves, the display screen 3 can rotate around the first steering part 42 and the second steering part 43 to realize the switch of the display screen 3 between the first state and the second state.

For example, as illustrated in FIGS. 8-10, in the direction from the first end 33 to the second end 34, the display screen 3 includes the non-display portion 32 and the display portion 31. When the display screen 3 is in the first state, the non-display portion 32 is located outside the display region of the electronic device 100, and the non-display portion 32 is winded around the first steering part 42 and is located at a side of the display portion 31 close to the housing 1. In order to ensure that the display portion 31 covers the display region of the electronic device 100 completely, a part of the display portion 31 may be bent around the second steering part 43. When the display screen 3 is switched to the second state, the display screen 3 may move towards the second end 34, the display portion 31 moves downwards and is bent around the second steering part 43, and the non-display portion 32 moves to face to the display region of the electronic device 100 and face to the camera 2.

Further, in some embodiments of the present disclosure, as illustrated in FIG. 8, respective surfaces of the first steering part 42 and the second steering part 43 away from each other are curved surfaces. Thus, the display screen 3 can be bent around the first steering part 42 and the second steering part 43, and move around the first steering part 42 and the second steering part 43 conveniently.

In some embodiments of the present disclosure, the first steering part 42 and the second steering part 43 are each formed as a cylindrical shaft, thereby simplifying the structures of the first steering part 42 and the second steering part 43. Further, the first steering part 42 and the second steering part 43 may be rotatably provided in the housing 1. Thus, during the movement of the display screen 3, the first steering part 42 and the second steering part 43 both can rotate, so as to decrease friction between the first steering part 42 and the display screen 3 and friction between the second steering part 43 and the display screen 3, reduce the wear of the display screen 3, and prolong the service life of the display screen 3.

Certainly, the present disclosure is not limited thereto. As illustrated in FIG. 8, the housing 1 has a middle frame 4 therein, and two opposite ends of the middle frame 4 are configured as the first steering part 42 and the second steering part 43 respectively. Hence, it is possible to lower the structural complexity of the electronic device 100 and enhance the production efficiency of the electronic device 100 by avoiding separate arrangement of the first steering part 42 and the second steering part 43.

Figure 11:
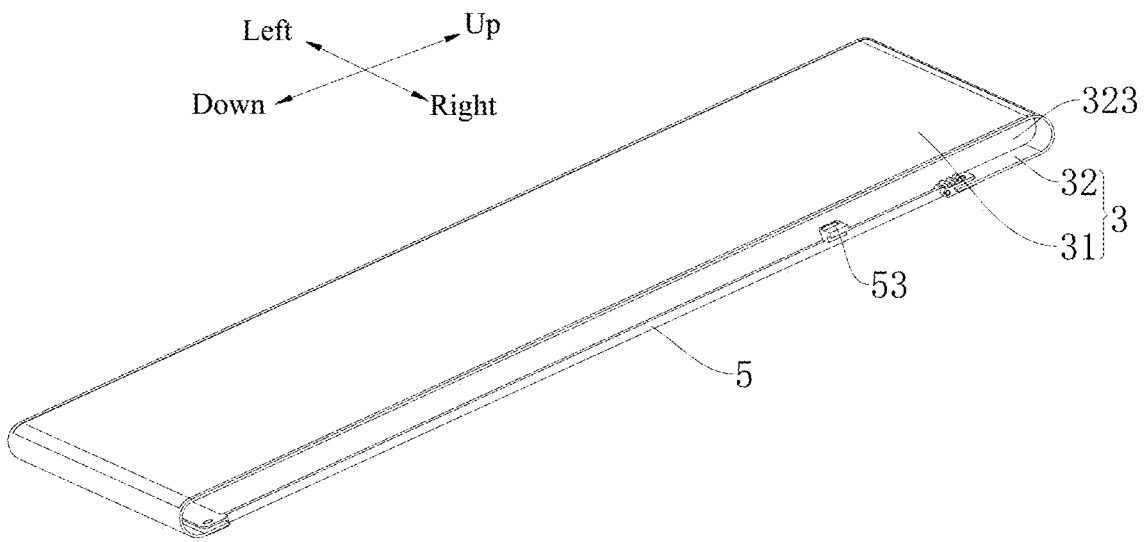
FIG. 11 illustrates a perspective view of a display screen and a connecting rod of an electronic device according to an embodiment of the present disclosure.
Figure 12:
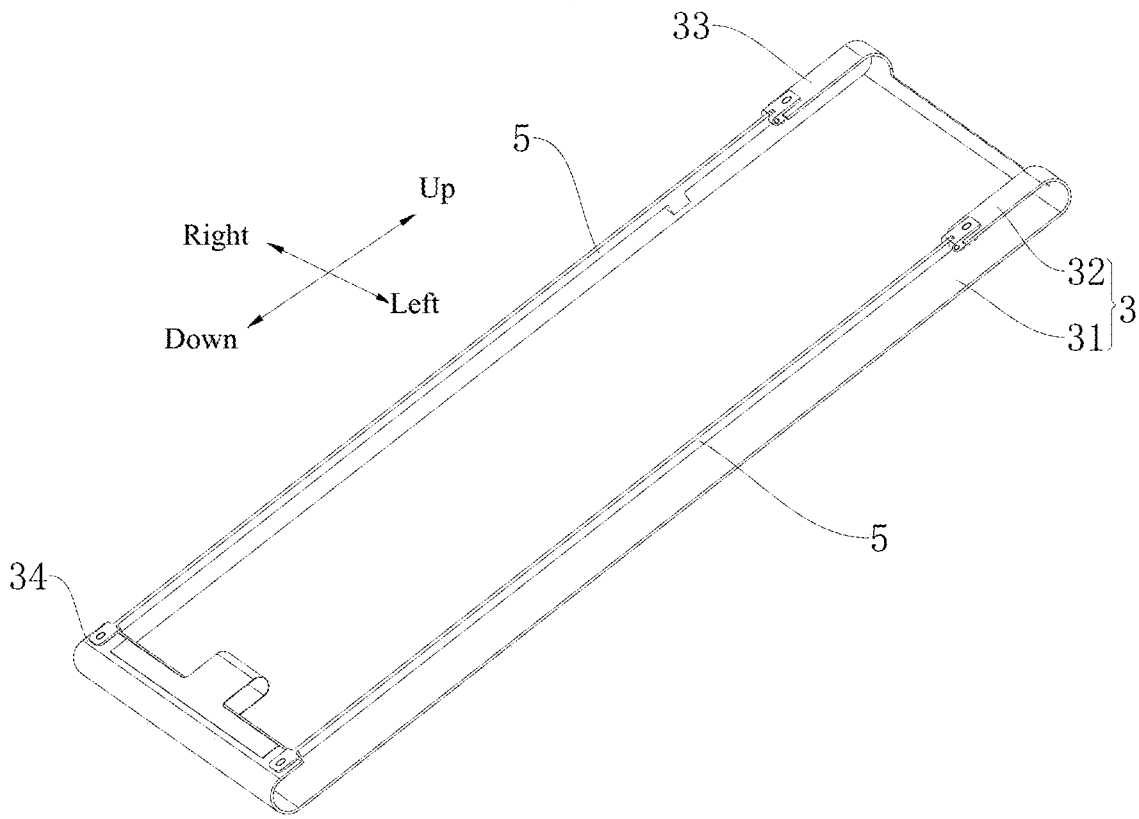
FIG. 12 illustrates a perspective view of a display screen and a connecting rod of an electronic device according to an embodiment of the present disclosure from another angle of view.
Figure 13:
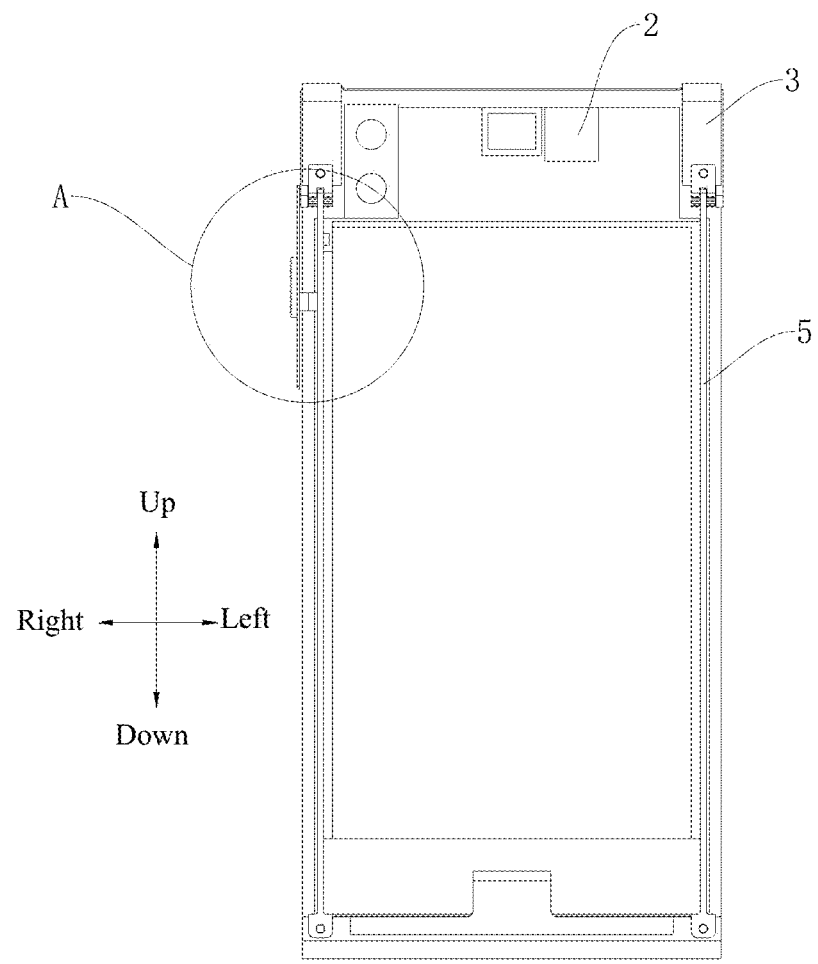
FIG. 13 illustrates a rear view of an electronic device according to an embodiment of the present disclosure.

In some embodiments of the present disclosure, as illustrated in FIGS. 11 and 12, the first end 33 and the second end 34 are connected via a connecting rod 5, and the display screen 3 together with the connecting rod 5 forms a ring shape, thereby avoiding winding the display screen 3 into a ring shape directly and hence reducing the material cost of the display screen 3. Furthermore, as illustrated in FIGS. 1, 11, 13 and 14, the connecting rod 5 is provided with a first toggling block 54, and the first toggling block 54 is at least partially located outside the housing 1. The housing 1 is provided with a guiding hole 13 fitted with the first toggling block 54, and the guiding hole 13 extends along the moving direction of the display screen 3. The first toggling block 54 is configured to toggle the connecting rod 5, so as to drive the display screen 3, by means of the connecting rod 5, to switch between the first state and the second state. Thus, the connecting rod 5 can be driven to move by means of the first toggling block 54, so as to drive the display screen 3 to move, thereby realizing the switch of the display screen 3 between the first state and the second state.

Figure 14:
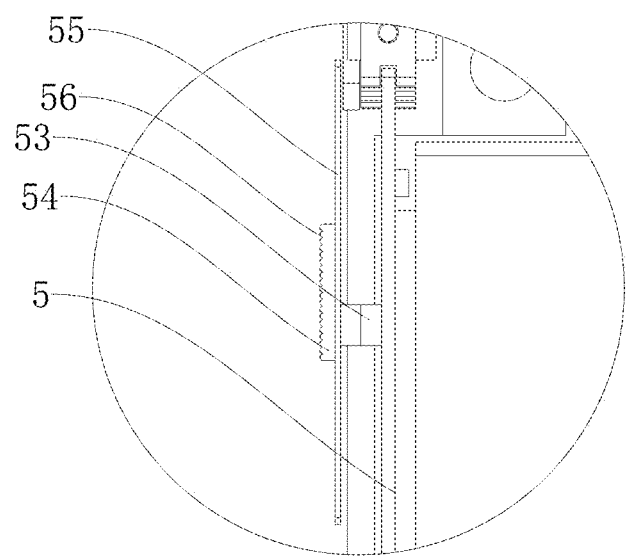
FIG. 14 illustrates an enlarged view of portion A circled in FIG. 13.

Further, as illustrated in FIG. 14, the connecting rod 5 is provided with an inserting block 53, the first toggling block 54 is provided with an insertion groove, and the inserting block 53 can be inserted into the insertion groove, so as to realize the connection between the first toggling block 54 and the connecting rod 5. Furthermore, as illustrated in FIG. 14, the first toggling block 54 is provided with a dustproof portion 55, the dustproof portion 55 is connected with the first toggling block 54 and surrounds the first toggling block 54, and a side surface of the dustproof portion 55 away from the connecting rod 5 is closely fitted with an inner side wall of the housing 1 and shields the guiding hole 13. Since the first toggling block 54 slides in the guiding hole 13, the guiding hole 13 has an area larger than an area of the first toggling block 54, and a gap exists between an inner peripheral wall defining the guiding hole 13 and an outer peripheral wall of the first toggling block 54. Consequently, the user can see the internal structure of the electronic device 100 from the outside of the housing 1, and external dust can easily enter the housing 1. In this aspect, the first toggling block 54 is provided with the dustproof portion 55 to block the guiding hole 13, which can upgrade aesthetics of the electronic device 100, and also improve a dustproof effect of the electronic device 100.

In some embodiments of the present disclosure, as illustrated in FIG. 14, the first toggling block 54 has a rough region 56 at a side of the first toggling block 54 outside the housing 1, and the rough region 56 is provided with a plurality of strip protrusions spaced apart from one another. The rough region 56 can increase friction between the user's hand and the first toggling block 54, so as to make it easy for the user to toggle the first toggling block 54 to move.

Figure 15:
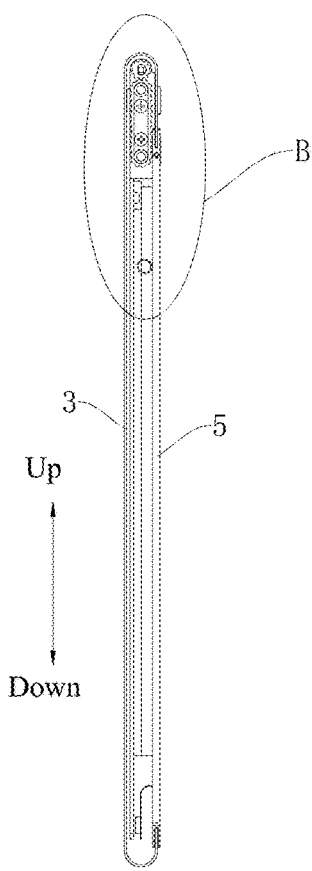
FIG. 15 illustrates a side view of a partial structure of an electronic device according to an embodiment of the present disclosure.
Figure 16:
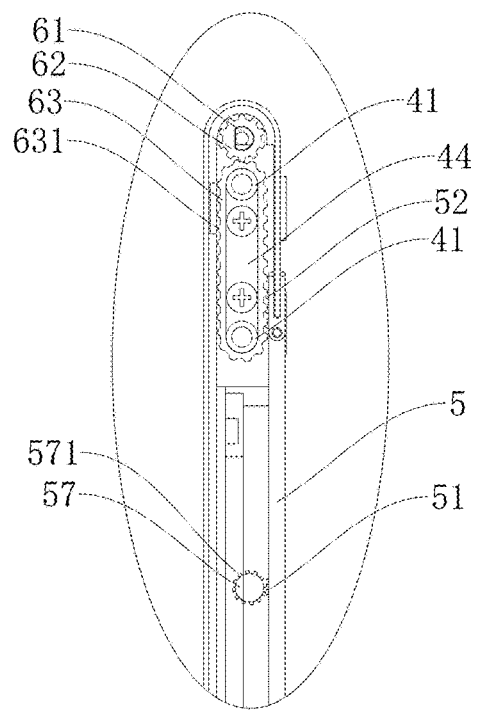
FIG. 16 illustrates an enlarged view of portion B circled in FIG. 15.

As illustrated in FIGS. 15 and 16, in some embodiments of the present disclosure, the connecting rod 5 is provided with a plurality of first teeth 51 spaced apart from one another along the moving direction of the display screen 3. The electronic device 100 further includes a rotary knob 57, and the rotary knob 57 is arranged through the housing 1 and provided with second teeth 571. The rotary knob 57 drives the connecting rod 5 to move by the second teeth 571 meshing with the first teeth 51, and the connecting rod 5 drives the display screen 3 to switch between the first state and the second state. When the rotary knob 57 is rotated, the rotary knob 57 can drive the connecting rod 5 and thus the display screen 3 to move, thereby switching the display screen 3 between the first state and the second state.

Further, a sealing member is provided between an outer peripheral wall of the rotary knob 57 and the housing 1. Thus, it is possible to prevent external dust from entering the housing 1 through a gap between the rotary knob 57 and the housing 1, thereby improving the dustproof effect of the electronic device 100.

In some embodiments of the present disclosure, as illustrated in FIGS. 11 and 12, a plurality of connecting rods 5 are provided and spaced apart from one another along a width direction of the first end 33 (a left and right direction as illustrated in FIG. 12). Thus, in a width direction of the display screen 3, the display screen 3 can keep more stable during the movement process thereof and be prevented from partially wrinkling, which would otherwise affect the display effect of the electronic device 100.

For example, in an example illustrated in FIGS. 11 and 12, two connecting rods 5 are provided and connected to two end portions of the first end 33 in the width direction thereof and to two end portions of the second end 34 in the width direction thereof, respectively, which can simplify the structure of the electronic device 100, and also improve the stability of the display screen 3 during the movement process thereof. The first toggling block 54 or the rotary knob 57 is connected and fitted with one of the connecting rods 5.

Further, as illustrated in FIGS. 12, 14 and 16, the connecting rod 5 is rotatably connected with at least one of the first end 33 and the second end 34. For example, as illustrated in FIG. 12, the connecting rod 5 is rotatably connected with the first end 33 and fixedly connected with the second end 34, which facilitates the movement of the display screen 3, avoids excessive hardness of the connecting rod 5, and hence facilitates the rotation of the display screen 3.

Figure 17:
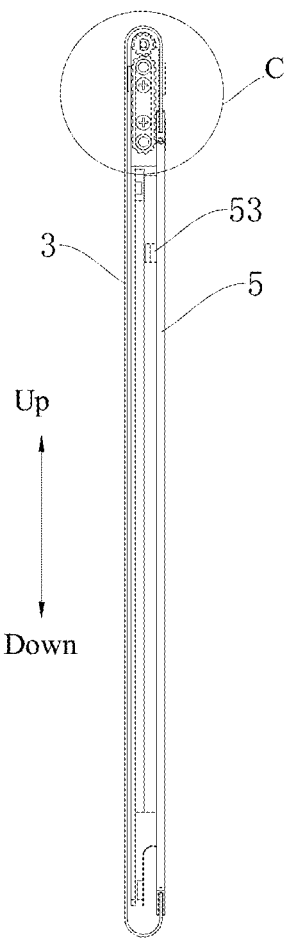
FIG. 17 illustrates a side view of a partial structure of an electronic device according to an embodiment of the present disclosure.
Figure 18:
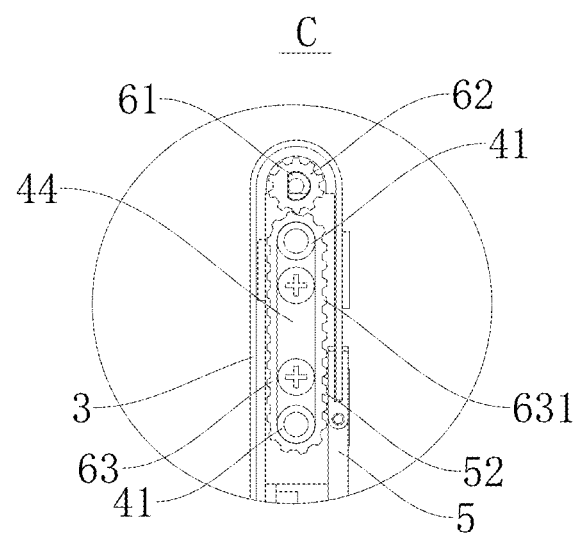
FIG. 18 illustrates an enlarged view of portion C circled in FIG. 17.
Figure 19:
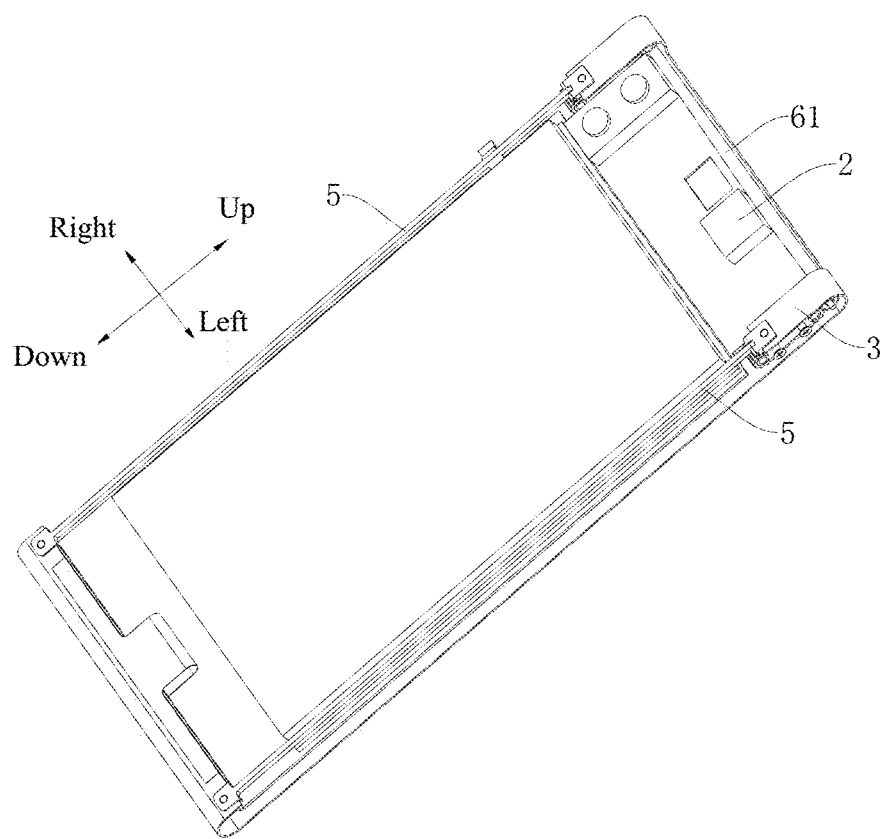
FIG. 19 illustrates a perspective view of a partial structure of an electronic device according to an embodiment of the present disclosure.

Further, as illustrated in FIGS. 17-19, the electronic device 100 further includes a fixed rod 61, and the fixed rod 61 is fitted with the plurality of connecting rods 5, respectively. The fixed rod 61 may be directly connected with the plurality of connecting rods 5, or may be connected and fitted with the plurality of connecting rods 5 by means of a transmission mechanism. Thus, the synchronous movement of the plurality of connecting rods 5 can be ensured, and hence connection points between the display screen 3 and the connecting rods 5 can be moved synchronously, thereby making the movement of the display screen 3 more stable.

Furthermore, as illustrated in FIGS. 17 and 18, the electronic device 100 also includes a plurality of gears 62, and the plurality of gears 62 are in one-to-one correspondence with the plurality of connecting rods 5 and all are connected with the fixed rod 61. The fixed rod 61 is configured as a cylindrical rod. In order to ensure the reliability of the connection between the fixed rod 61 and the gears 62, a section of the fixed rod 61 fitted with the gear 62 has a cross section whose outer contour includes a straight segment and a major-arc segment connected end to end, and correspondingly, the corresponding gear 62 fitted with the segment of the fixed rod 61 also has a cross section whose inner contour includes a straight segment and a major-arc segment, so as to avoid relative rotation between the fixed rod 61 and the gear 62.

As illustrated in FIG. 18, the connecting rod 5 is provided with third teeth 52 engaged with the gear 62. When one of the connecting rods 5 is driven to move, this connecting rod 5 meshes with the corresponding gear 62 to drive the fixed rod 61 connected with the gear 62 to rotate. Other gears 62 on the fixed rod 61 mesh with the third teeth 52 of other connecting rods 5 correspondingly to drive the corresponding connecting rods 5 to move, thereby achieving the synchronous movement of the plurality of connecting rods 5, so as to make the display screen 3 stressed more uniformly and the movement process thereof more stable.

In some embodiments of the present disclosure, as illustrated in FIG. 18, the electronic device 100 further includes a plurality of transmission belts 63 in one-to-one correspondence with the plurality of gears 62. The transmission belt 63 is rotatably provided in the housing 1 and may be located between the gear 62 and the connecting rod 5. The transmission belt 63 is provided with a plurality of fourth teeth 631 on an outer peripheral wall thereof, and the fourth teeth 631 are engaged with the gear 62 and the third teeth 52 respectively, such that the connecting rod 5 drives, by means of the transmission belt 63, the gear 62 to rotate. Therefore, when one of the connecting rods 5 is driven to move, this connecting rod 5 first drives the transmission belt 63 to rotate, and the transmission belt 63 meshes with the gear 62 to drive the gear 62 to rotate, and then drives the fixed rod 61 connected with the gear 62 to rotate. Other gears 62 on the fixed rod 61 mesh with the fourth teeth 631 of other transmission belts 63 correspondingly to drive the corresponding transmission belts 63 to rotate, thereby driving the corresponding connecting rods 5 to move to achieve the synchronous movement of the plurality of connecting rods 5, so as to make the display screen 3 stressed more uniformly and the movement process thereof more stable.

The middle frame 4 of the housing 1 is provided with two bearings 41 spaced apart from each other in the moving direction of the display screen 3, and the transmission belt 63 is fitted over the two bearings 41. When the transmission belt 63 rotates, the bearings 41 are driven to rotate, thereby reducing the friction between the transmission belt 63 and the bearings 41.

In some embodiments of the present disclosure, the middle frame 4 is provided with an accommodating groove 44, and the gear 62 and the transmission belt 63 are provided in the accommodating groove 44. The surface of the middle frame 4 may be provided with a Teflon layer to reduce friction between other components and the middle frame.

Figure 20:
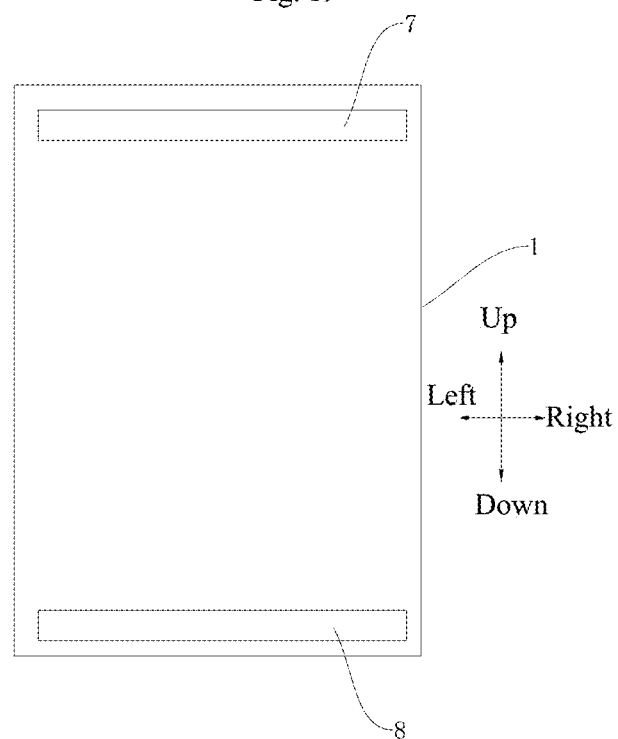
FIG. 20 illustrates a schematic view of a housing, a first rotating shaft, and a second rotating shaft of an electronic device according to an embodiment of the present disclosure.

The housing 1 has the third end 11 and the fourth end 12 opposite to each other. As illustrated in FIG. 20, the electronic device 100 further includes a first rotating shaft 7 and a second rotating shaft 8. The first rotating shaft 7 and the second rotating shaft 8 are both located in the housing 1. The first rotating shaft 7 may be rotatably provided to the third end 11 (an upper end as illustrated in FIG. 20) and the second rotating shaft 8 may be provided to the fourth end 12 (a lower end as illustrated in FIG. 20). The first rotating shaft 7 is parallel with the second rotating shaft 8, and extends along the width direction of the third end 11 (e.g. a left and right direction as illustrated in FIG. 20).

Figure 21:
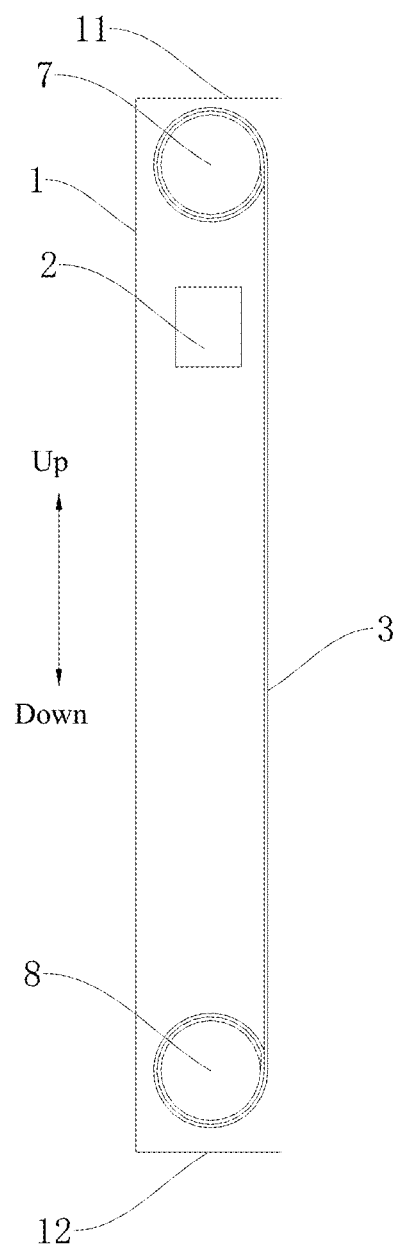
FIG. 21 illustrates a schematic view of a housing, a first rotating shaft, a second rotating shaft, and a display screen of an electronic device according to an embodiment of the present disclosure.

As illustrated in FIG. 21, the display screen 3 is a flexible screen. The first end 33 (an upper end as illustrated in FIG. 21) of the display screen 3 is connected with the first rotating shaft 7, while the second end 34 (a lower end as illustrated in FIG. 21) of the display screen 3 is connected with the second rotating shaft 8. At least a part of the display screen 3 may be winded around at least one of the first rotating shaft 7 and the second rotating shaft 8. A part of the display screen 3 close to the first rotating shaft 7 may be winded around the first rotating shaft 7, and another part of the display screen 3 close to the second rotating shaft 8 may be winded around the second rotating shaft 8. When the first rotating shaft 7 and the second rotating shaft 8 rotate, the display screen 3 can be driven to switch between the first state and the second state.

When at least one of the first rotating shaft 7 and the second rotating shaft 8 rotates, the display screen 3 can be released from one of the first rotating shaft 7 and the second rotating shaft 8 and be rolled up at the other one of the first rotating shaft 7 and the second rotating shaft 8. The movement of the display screen 3 allows the display screen 3 to switch between the first state and the second state.

When the user wants to take pictures with the camera 2, the display screen 3 can be switched to the second state, and the light at the side of the display screen 3 away from the camera 2 can enter the camera 2 through the light-transparent non-display portion 32, so as to ensure the photographing quality of the camera 2. When the camera 2 is not in use, the display screen 3 can be switched to the first state, the camera 2 faces to the display portion 31 and is shielded by the display portion 31 of the display screen 3, and the display portion 31 faces to the display region of the electronic device 100, such that the electronic device 100 can perform the full-screen display, thus upgrading the user experience.

As illustrated in FIG. 5, the non-display portion 32 is arranged above, while the display portion 31 is arranged below. An end of the non-display portion 32 away from the display portion 31 is connected with the first rotating shaft 7, and an end of the display portion 31 away from the non-display portion 32 is connected with the second rotating shaft 8. When the display screen 3 is in the first state, the non-display portion 32 may be winded around the first rotating shaft 7, and the display portion 31 is spread, such that the display portion 31 faces to the display region of the electronic device 100 to perform display. When the display screen 3 is switched to the second state, the second rotating shaft 8 is rotated, a part of the display portion 31 close to the second rotating shaft 8 is gradually winded around the second rotating shaft 8, the display portion 31 moves towards the second rotating shaft 8, the non-display portion 32 is released from the first rotating shaft 7, and the non-display portion 32 moves towards the second rotating shaft 8. In such a way, the camera 2 faces to the non-display portion 32 to allow the light at the side of the display screen 3 away from the camera 2 to enter the camera 2 through this light-transparent portion, thereby guaranteeing the photographing quality of the camera 2.

As illustrated in FIG. 6, the non-display portion 32 includes the first non-display portion 321 and the second non-display portion 322, and in a direction from one end (an upper end as illustrated in FIG. 6) of the display screen 3 to the other end (a lower end as illustrated in FIG. 6) of the display screen 3, the first non-display portion 321, the display portion 31 and the second non-display portion 322 are arranged in sequence. The first non-display portion 321 and the second non-display portion 322 are respectively arranged at the two ends (the upper end and the lower end as illustrated in FIG. 6) of the display screen 3, and the display portion 31 is arranged between the first non-display portion 321 and the second non-display portion 322.

When the display screen 3 is in the first state, the first non-display portion 321 may be winded around the first rotating shaft 7, the second non-display portion 322 may be winded around the second rotating shaft 8, and the display portion 31 faces to the display region of the electronic device 100 to perform display. When the display screen 3 is in the second state, the camera 2 may face to one of the first non-display portion 321 and the second non-display portion 322. When the camera 2 needs to face to the first non-display portion 321, the second rotating shaft 8 may be rotated, the part of the display portion 31 close to the second rotating shaft 8 is gradually winded around the second rotating shaft 8, the first non-display portion 321 is released from the first rotating shaft 7, and the first non-display portion 321 moves towards the second rotating shaft 8, such that the camera 2 faces to the first non-display portion 321. When the camera 2 needs to face to the second non-display portion 322, the first rotating shaft 7 can be rotated, a part of the display portion 31 close to the first rotating shaft 7 is gradually winded around the first rotating shaft 7, the second non-display portion 322 is released from the second rotating shaft 8, and the second non-display portion 322 moves towards the first rotating shaft 7, such that the camera 2 faces to the second non-display portion 322.

Figure 22:
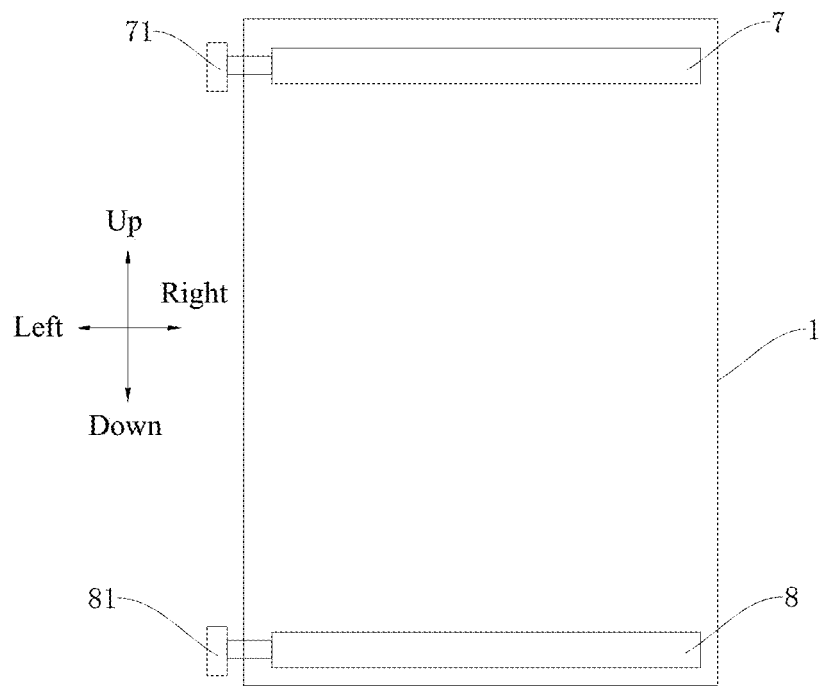
FIG. 22 illustrates a schematic view of a housing, a first rotating shaft, a second rotating shaft, a first rotary knob, and a second rotary knob of an electronic device according to an embodiment of the present disclosure.

In some embodiments of the present disclosure, as illustrated in FIG. 22, the electronic device 100 further includes a first rotary knob 71 and a second rotary knob 81. The first rotary knob 71 and the second rotary knob 81 are arranged through the housing 1, the first rotary knob 71 is connected with the first rotating shaft 7 to drive the first rotating shaft 7 to rotate, and the second rotary knob 81 is connected with the second rotating shaft 8 to drive the second rotating shaft 8 to rotate. The first rotary knob 71 and the second rotary knob 81 are partially located outside the housing 1, such that the user can realize the rotation of the first rotating shaft 7 and the second rotating shaft 8 by directly rotating the first rotary knob 71 and the second rotary knob 81 respectively. In such a way, the first rotating shaft 7 and the second rotating shaft 8 can drive the display screen 3 to move so as to realize the switch of the display screen 3 between the first state and the second state.

Figure 23:
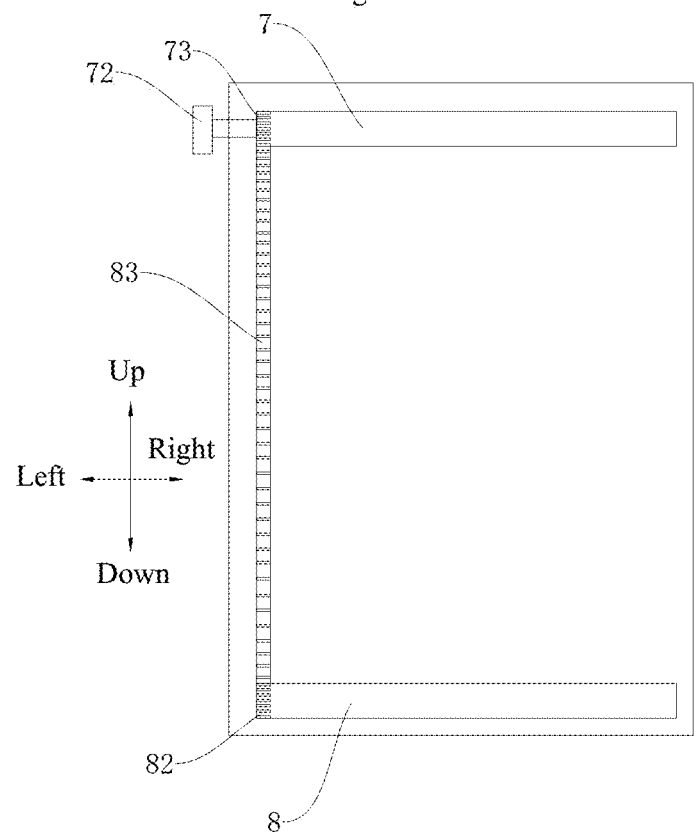
FIG. 23 illustrates a schematic view of a housing, a first rotating shaft, a second rotating shaft, a third rotary knob, and a rack of an electronic device according to an embodiment of the present disclosure.

In some embodiments of the present disclosure, as illustrated in FIG. 23, the electronic device 100 further includes a rack 83 and a third rotary knob 72, and the rack 83 is arranged in the housing 1 and extends along the moving direction of the display screen 3 (an up and down direction as illustrated in FIG. 23). The third rotary knob 72 is arranged through the housing 1 and is partially located outside the housing 1. The third rotary knob 72 is connected with the first rotating shaft 7, such that the user can realize a purpose of driving the first rotating shaft 7 to rotate by rotating the third rotary knob 72. At least one of a part of the third rotary knob 72 located within the housing 1 and the first rotating shaft 7 is provided with fifth teeth 73. That is, only the part of the third rotary knob 72 located within the housing 1 is provided with the fifth teeth 73, or only the first rotating shaft 7 is provided with the fifth teeth 73, or the part of the third rotary knob 72 located within the housing 1 and the first rotating shaft 7 are both provided with the fifth teeth 73. For example, as illustrated in FIG. 23, only the first rotating shaft 7 is provided with the fifth teeth 73.

The fifth teeth 73 mesh with the rack 83, and the second rotating shaft 8 is provided with sixth teeth 82 meshing with the rack 83. When the third rotary knob 72 is rotated, the third rotary knob 72 can drive the first rotating shaft 7 to rotate, the fifth teeth 73 of the first rotating shaft 7 mesh with the rack 83 to drive the rack 83 to move along the moving direction of the display screen 3, and the rack 83 meshes with the sixth teeth 82 of the second rotating shaft 8 to drive the second rotating shaft 8 to rotate. Thus, the first rotating shaft 7 and the second rotating shaft 8 drive the display screen 3 to move so as to realize the switch of the display screen 3 between the first state and the second state.

Figure 24:
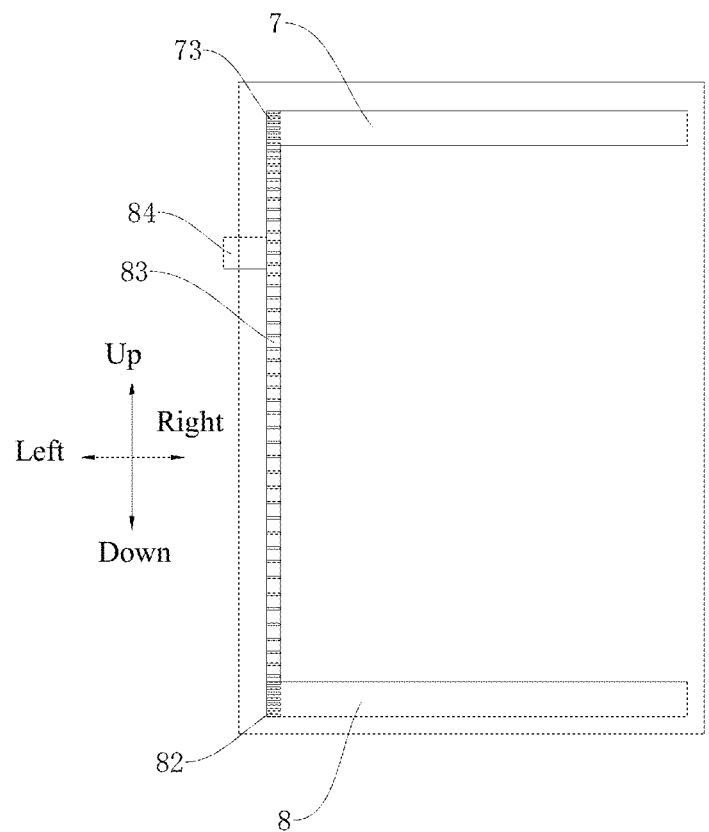
FIG. 24 illustrates a schematic view of a housing, a first rotating shaft, a second rotating shaft, a second toggling block, and a rack of an electronic device according to an embodiment of the present disclosure.

In some embodiments of the present disclosure, as illustrated in FIG. 24, the first rotating shaft 7 is provided with the fifth teeth 73 and the second rotating shaft 8 is provided with the sixth teeth 82. The electronic device 100 further includes the rack 83, the rack 83 is provided in the housing 1 and extends along the moving direction of the display screen 3 (an up and down direction as illustrated in FIG. 24), and the rack 83 may mesh with the fifth teeth 73 and the sixth teeth 82. The rack 83 is provided with a second toggling block 84, and the second toggling block 84 is at least partially located outside the housing 1. The housing 1 is provided with the guiding hole 13 fitted with the second toggling block 84, and the guiding hole 13 extends along the moving direction of the display screen 3. Hence, the user can drive the rack 83 to move by toggling the second toggling block 84, such that the rack 83 drives the first rotating shaft 7 and the second rotating shaft 8 to rotate, and the first rotating shaft 7 and the second rotating shaft 8 drive the display screen 3 to move, thereby realizing the switch of the display screen 3 between the first state and the second state.

In some embodiments of the present disclosure, the length of the display portion 31 is greater than or equal to the length of the display region of the electronic device 100. Thus, it is possible to avoid an error when the display screen 3 is switched between the first state and the second state, and to prevent the display portion 31 from failing to be completely aligned with the entire display region of the electronic device 100. When the display screen 3 is in the first state, the display effect of the electronic device 100 can be guaranteed.

Figure 25:
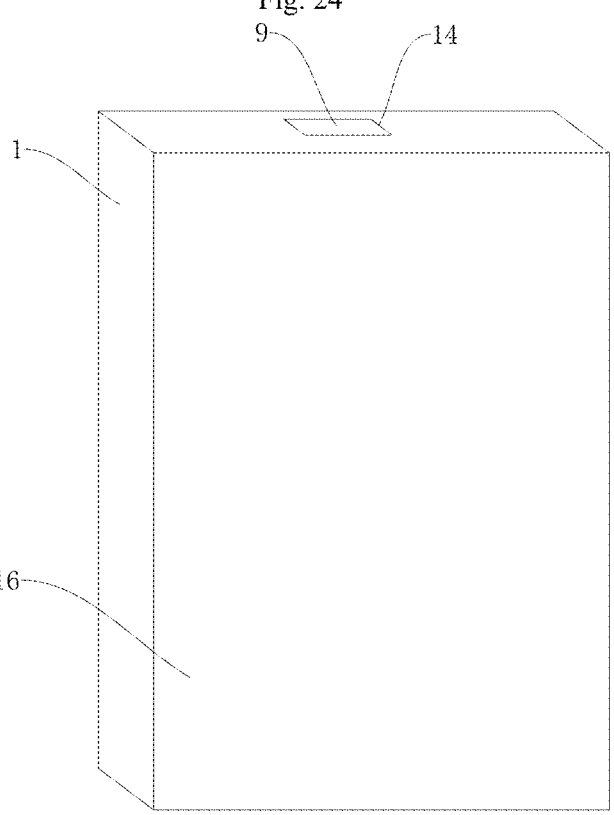
FIG. 25 illustrates a perspective view of an electronic device according to an embodiment of the present disclosure.

In some embodiments of the present disclosure, as illustrated in FIG. 25, the housing 1 is provided with a receiver slot 14 in its outer peripheral wall, and a receiver assembly 9 of the electronic device 100 is provided in the receiver slot 14. Thus, it is possible to prevent the receiver assembly 9 from occupying the space of the display screen 3, and hence to improve the screen-to-body ratio of the electronic device 100. Further, the electronic device 100 also includes a drive mechanism provided in the housing 1, and the drive mechanism is coupled with the receiver assembly 9 to drive the receiver assembly 9 to move out of the housing 1 and also to drive the receiver assembly 9 to move into the receiver slot 14. When the receiver assembly 9 is to be used, the receiver assembly 9 can be moved out of the housing 1 by the drive mechanism, so that it is convenient for the user to receive sounds. When the user does not need to use the receiver assembly 9 any more, the receiver assembly 9 can be moved into the housing 1, so as to improve the aesthetics of the electronic device 100.

Certainly, the present application is not limited thereto. As illustrated in FIGS. 1 and 2, the housing 1 is provided with an elongated receiver hole 15 at its side facing the user during the use of the electronic device 100, and the receiver hole 15 is arranged adjacent to an edge of the housing 1 and extends along a peripheral direction of the housing 1, specifically along the edge of the housing 1. The housing 1 is also provided with a sound channel, and the sound channel has a first end coupled with a sound hole of the receiver assembly 9 and a second end coupled with the receiver hole 15. In such a way, the space of the display screen 3 occupied by the receiver assembly 9 can be reduced, and the sound can be transmitted from the side facing the display screen 3, which is convenient for the user to use.

In some embodiments of the present disclosure, the electronic device 100 has a display window for display, and along the moving direction of the display screen 3, the length of the display portion 31 is greater than or equal to the length of the display window of the electronic device 100. Thus, it is possible to avoid an error when the display screen 3 is switched between the first state and the second state, and also to prevent the display portion 31 from failing to be completely aligned with the entire display region of the electronic device 100. When the display screen 3 is in the first state, the display effect of the electronic device 100 can be guaranteed.

In the embodiments of the present disclosure, the electronic device 100 may be various devices capable of acquiring data from the outside and processing the data, or the electronic device 100 may be various devices that have a built-in battery and are capable of acquiring current from the outside to charge the battery, such as, mobile phones, tablet computers, computing devices or information display devices, etc.

The electronic device 100 may be a user terminal or user equipment (UE) that may be broadly defined to include any electronic devices, computing devices and/or telecommunication devices (or a combination thereof), which is readily transportable by the user and capable of wireless communication. The electronic device 100 may also be other equipment or devices having communication functions.

The electronic device 100 may include, but is not limited to, the following examples.

The electronic device 100 may be various types of communication tools, such as a mobile phone, a smart phone, a cellular phone, a video phone, a landline phone, a pager, a visual phone, or the like.

The electronic device 100 may be various types of computers, such as laptop computers, desktop computers, notebook computers, tablet computers, PDAs (Personal Digital Assistants, palmtops), portable Internet devices, personal digital assistants, workstations, servers or the like.

The electronic device 100 may be various types of media players, such as a music player (like an MP3 player), an audio player, a video player, a portable multimedia player (PMP), a digital video disc (DVD) player, a television set, or other media players.

The electronic device 100 may be a media recorder, such as a music recorder, a tape recorder, a video recorder, a camera, a video camera or the like.

The electronic device 100 may be game equipment, such as a game machine, a portable game device, or a game device.

The electronic device may be a wearable computing device, display or other wearable devices, such as a watch, an earphone, a headset, electronic glasses, electronic clothing, an electronic bracelet, an electronic necklace, an electronic accessory, an electronic tattoo, contact lens, a head mounted device (HMD), a fabric or garment overall wearable device (e.g., an electronic garment), an implantable wearable device (e.g., an implantable circuit), or other types of electronic devices that can receive biometric data from a biometric sensing device.

The electronic device 100 may be other types of devices, such as a radio, a printer, a calculator, a programmable remote control, an electronic dictionary, an e-reader, an electronic key, an electronic photo frame, a data storage device, a global positioning system, a medical device, a vehicle transportation instrument, or other handheld devices.

In addition, the electronic device 100 of the present disclosure can also perform various functions (for example, having functions of playing music, displaying videos, storing pictures, and receiving and transmitting telephone calls).

The electronic device 100 to which the present disclosure is applicable is introduced by taking a mobile phone as an example. In the embodiments of the present disclosure, the mobile phone may include a radio-frequency circuit, a memory, an input unit, a wireless fidelity (Wi-Fi) module, a display unit, a sensor, an audio circuit, a processor, a projection unit, a photographing unit, a battery, and other components.

The radio-frequency circuit may be used to receive and transmit a signal during information transmission and reception or during a call. Especially, when downlink information from a base station is received, the RF circuit sends the downlink information to the processor for processing, and additionally sends uplink data from the mobile phone to the base station. Usually, the RF circuit includes but is not limited to an antenna, at least one amplifier, a transceiver, a coupler, a low-noise amplifier, a duplexer and etc. In addition, the RF circuit can communicate with the network and other devices via wireless communication. The wireless communication can employ any communication standard or protocol, including but not limited to global system for mobile communication (GSM), general packet radio service (GPRS), code division multiple access (CDMA), wideband code division multiple access (WCDMA), long term evolution (LTE), e-mail and short messaging service (SMS).

The memory may be used to store software programs and modules, and the processor runs various function applications in the mobile phone and performs data processing by running the software programs and modules stored in the memory. The memory mainly includes a program storage area and a data storage area. The program storage area can store an operating system, at least one application program required for a function (such as a voice playback function, an image playback function and etc.); the data storage area can store data (such as audio data, contacts and etc.) created according to the use of the mobile phone. In addition, the memory may include a high-speed random access memory, and may also include a non-volatile memory, such as at least one disk storage device, a flash memory device, or other volatile solid-state memory devices.

The input unit may be configured to receive incoming numbers or character information, and generate a key signal related to user settings and function control of the mobile phone. Specifically, the input unit may include a touch panel and other input devices. The touch panel, also known as a touch screen, can collect a touch operation made by a user on or near the touch panel (for example, an operation made by the user on the touch panel or near the touch panel by means of a finger, a touch pen or any other suitable object or accessory), and drive the corresponding connection device according to a preset program. Optionally, the touch panel may include a touch detection device and a touch controller.

The touch detection device is configured to detect a touch orientation of the user, detect a signal from the touch operation, and transmit the signal to the touch controller. The touch controller is configured to receive the touch information from the touch detection device, convert it into contact coordinates and send the contact coordinates to the processor, and also configured to receive and execute a command from the processor. In addition, it is possible to realize the touch panel in resistive type, capacitive type, infrared type, surface acoustic wave type and other types. The input unit may include other input devices apart from the touch panel. Specifically, other input devices may include, but are not limited to one or more of a physical keypad, a function key (e.g. a volume control button, an on/off button, etc.), a trackball, a mouse and an operating rod.

In addition, the mobile phone may also include at least one sensor, such as an attitude sensor, a light sensor and other sensors.

Specifically, the attitude sensor may also be referred as a motion sensor, and as one kind of motion sensor, a gravity sensor can be employed. As for the gravity sensor, a cantilever displacement device is made of an elastic-sensitive element, and an electrical contact is driven by an energy-storage spring made of the elastic-sensitive element, so as to achieve the conversion of gravity changes into electrical signal changes.

As an alternative motion sensor, an accelerometer sensor may be used. The accelerometer sensor can detect the magnitude of acceleration in all directions (generally in three axes), and detect the magnitude and direction of the gravity at rest, and can be used for attitude identification of the mobile phone (such as horizontal and vertical screen switch, related games, magnetometer attitude calibration), and vibration-recognition related functions (such as pedometer and percussion).

In the embodiments of the present disclosure, the motion sensors listed above may be used as an element for obtaining an "attitude parameter" described later, which is not limited thereto, however. Other sensors capable of obtaining the "attitude parameter" fall into the protection scope of the present disclosure, for example, a gyroscope. The working principle and data processing of the gyroscope may be similar to those in the related art, so the detailed description thereof will be omitted to avoid redundancy.

In addition, in the embodiments of the present disclosure, a barometer, a hygrometer, a thermometer, an infrared sensor or the like may be used as a sensor, which will not be described in detail.

The light sensor may include an ambient light sensor and a proximity sensor, in which the ambient light sensor can adjust brightness of the display panel in accordance with the ambient light, and the proximity sensor can turn off the display panel and/or the backlight when the mobile phone is moved to the ear.

The audio circuit, the loudspeaker and the microphone can provide an audio interface between the user and the mobile phone. The audio circuit can transmit an electrical signal converted from the received audio data to the loudspeaker, and the loudspeaker converts the electrical signal into an audio signal to be output. On the other hand, the microphone converts the collected audio signal into the electrical signal, and the audio circuit receives and converts the electrical signal into audio data, and transmits the audio data to the processor. After processed by the processor, the audio data is sent to, for example, another mobile phone via the RF circuit, or is output to the memory for further processing.

Wi-Fi is a short-distance wireless transmission technology, and the mobile phone can help the user to send and receive e-mails, browse websites, and access streaming media by means of the Wi-Fi module which provides the user with wireless broadband access to the Internet. However, it could be understood that the Wi-Fi module is not a necessary component of the mobile phone and can be omitted as needed without changing the nature of the present disclosure.

The processor is a control center of the mobile phone, is coupled to various parts of the mobile phone by means a variety of interfaces and lines, and performs various functions of the mobile phone and data processing by running or executing software programs and/or modules stored in the memory and by invoking the data stored in the memory, so as to monitor the mobile phone overall. Optionally, the processor may include one or more processing units; preferably, the processor can be integrated with an application processor and a modem processor, in which the application processor mainly handles the operating system, the user interface and the application program, while the modem processor mainly deals with wireless communication.

It could be understood that the modem processor may not be integrated into the processor.

Moreover, the processor may act as an implementing element of the processing unit, to perform the same or similar function as the processing unit.

The mobile phone further includes a power source (like a battery) that supplies power to various components.

Preferably, the power source may be logically coupled to the processor by means of a power management system, to manage functions such as charging, discharging, and power management by means of the power management system.

Although not shown, the mobile phone may also include a Bluetooth module and so on, which will not be described herein.

A photographing control method for the electronic device 100 according to embodiments of the present disclosure will be described with reference to the drawings.

The photographing control method for the electronic device 100 according to embodiments of the present disclosure includes: receiving a photographing preview instruction, in which the photographing preview instruction is configured to trigger the electronic device 100 to control the display screen 3 to switch from the first state to the second state and trigger the camera 2 to turn on image preview; and receiving a photographing instruction that is configured to trigger the camera 2 to collect light through the non-display portion 32 of the display screen 3 and perform imaging. Thus, the camera 2 of the electronic device 100 can take photos conveniently.

In the photographing control method for the electronic device 100 according to embodiments of the present disclosure, by providing the camera 2 in the housing 1 and positioning the display screen 3 at the side of the camera 2 away from the housing 1, the space of the display screen 3 occupied by the camera 2 can be reduced, the screen-to-body ratio of the electronic device 100 can be increased, and hence the full-screen display can be realized. Additionally, the display screen 3 is switchable between the first state and the second state. When the display screen 3 is in the first state, the camera 2 faces to the display portion 31 and the display portion 31 faces to the display region of the electronic device 100, such that the electronic device 100 can perform the full-screen display, thereby improving the display effect of the electronic device 100. When the display screen 3 is in the second state, the camera 2 faces to the non-display portion 32, and the camera 2 can receive the light at the side of the display screen 3 away from the camera 2, thereby guaranteeing the photographing quality of the camera 2.

In some embodiments of the present disclosure, the photographing control method further includes: receiving a photographing end instruction that is configured to trigger the camera 2 to turn off the image preview and trigger the electronic device 100 to control the display screen 3 to switch from the second state to the first state, thereby facilitating the full-screen display of the electronic device 100 and improving the screen-to-body ratio of the electronic device 100.

Reference throughout this specification to "an embodiment," "some embodiments," "an exemplary embodiment," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although embodiments have been illustrated and described, it would be appreciated by those skilled in the art that changes, modifications, alternatives and variants can be made in the embodiments without departing from principles and purposes of the present disclosure. The protection scope of the present disclosure is defined by the claims or the like.

What is claimed is:

1. An electronic device, comprising:
a housing;
a camera provided in the housing; and
a display screen movably assembled to the housing, and switchable between a first state and a second state with respect to the housing, the display screen having a display portion and a non-display portion, the non-display portion being light transparent,
wherein when the display screen is in the first state, the camera is covered by the display portion, and when the display screen is in the second state, the camera faces to the non-display portion, and configured to collect light through the non-display portion and perform imaging.

2. The electronic device according to claim 1, wherein the display screen has a first end and a second end opposite to each other, and the display screen is movable in a direction from the first end to the second end and in a direction from the second end to the first end.

3. The electronic device according to claim 2, wherein in the direction from the first end to the second end, the non-display portion and the display portion are arranged in sequence.

4. The electronic device according to claim 2, wherein the non-display portion comprises a first non-display portion and a second non-display portion, and in the direction from the first end to the second end, the first non-display portion, the display portion and the second non-display portion are arranged in sequence;
when the display screen is in the second state, the camera faces to one of the first non-display portion and the second non-display portion.

5. The electronic device according to claim 2, wherein the display portion surrounds the non-display portion, and the non-display portion is adjacent to the first end of the display screen.

6. The electronic device according to claim 2, wherein the housing has a third end and a fourth end opposite to each other, and the electronic device further comprises:
a first steering part and a second steering part both provided in the housing, the first steering part being located at the third end of the housing, the second steering part being located at the fourth end of the housing, the first steering part and the second steering part being parallel with each other, and the first steering part extending along a width direction of the third end,
wherein the display screen is a flexible screen, the first end is bent around the first steering part, and the second end is bent around the second steering part, such that the first end and the second end are connected.

7. The electronic device according to claim 6, wherein the first end and the second end are connected via a connecting rod.

8. The electronic device according to claim 7, wherein the connecting rod is provided with a first toggling block, the first toggling block is at least partially located outside the housing, the housing is provided with a guiding hole fitted with the first toggling block, the guiding hole extends along a moving direction of the display screen, and the first toggling block is configured to toggle the connecting rod, and the display screen is driven by the connecting rod to switch between the first state and the second state.

9. The electronic device according to claim 7, wherein the connecting rod is provided with a plurality of first teeth spaced apart from one another in a moving direction of the display screen, the electronic device further comprises a rotary knob, the rotary knob is arranged through the housing and provided with second teeth, the rotary knob drives the connecting rod to move by the second teeth meshing with the first teeth, and the connecting rod drives the display screen to switch between the first state and the second state.

10. The electronic device according to claim 7, wherein a plurality of connecting rods are provided and spaced apart from one another in a width direction of the first end.

11. The electronic device according to claim 10, further comprising a fixed rod and a plurality of gears, wherein the plurality of gears are in one-to-one correspondence to the plurality of connecting rods and are connected with the fixed rod, and the connecting rod is provided with a plurality of third teeth engaged with the gear.

12. The electronic device according to claim 11, further comprising a plurality of transmission belts in one-to-one correspondence with the plurality of gears, wherein the transmission belt is rotatably arranged in the housing and provided with a plurality of fourth teeth on an outer peripheral wall thereof, the fourth teeth mesh with the gear and the third teeth, and the connecting rod drives the gear to rotate by means of the transmission belt.

13. The electronic device according to claim 2, wherein the housing has a third end and a fourth end opposite to each other, and the electronic device further comprises:
  a first rotating shaft and a second rotating shaft both located in the housing, the first rotating shaft being rotatably provided to the third end, the second rotating shaft being rotatably provided to the fourth end, and the first rotating shaft being parallel with the second rotating shaft and extending along a width direction of the third end;
  wherein the display screen is a flexible screen, the first end is connected with the first rotating shaft, the second end is connected with the second rotating shaft, and at least a part of the display screen is configured to be winded around at least one of the first rotating shaft and the second rotating shaft, such that when the first rotating shaft and the second rotating shaft rotate, the display screen is driven to switch between the first state and the second state.

14. The electronic device according to claim 13, further comprising a first rotary knob and a second rotary knob arranged through the housing, the first rotary knob being connected with the first rotating shaft to drive the first rotating shaft to rotate, and the second rotary knob being connected with the second rotating shaft to drive the second rotating shaft to rotate.

15. The electronic device according to claim 13, further comprising:
  a rack provided in the housing and extending along a moving direction of the display screen; and
  a third rotary knob arranged through the housing and connected with the first rotating shaft, at least one of a part of the third rotary knob located within the housing and the first rotating shaft being provided with fifth teeth, the fifth teeth meshing with the rack, and the second rotating shaft being provided with sixth teeth meshing with the rack,
  wherein the third rotary knob is configured to rotate to drive the rack to rotate, and the rack is configured to drive the second rotating shaft to rotate, so as to switch the display screen between the first state and the second state.

16. The electronic device according to claim 13, wherein the first rotating shaft is provided with fifth teeth, the second rotating shaft is provided with sixth teeth, and the electronic device further comprises:
  a rack provided in the housing, extending along a moving direction of the display screen, and meshing with the fifth teeth and the sixth teeth, in which the rack is provided with a second toggling block, the second toggling block is at least partially located outside the housing, the housing is provided with a guiding hole fitted with the second toggling block, and the guiding hole extends along the moving direction of the display screen,
  wherein the second toggling block is configured to drive the rack to rotate, and the rotate is configured to drive the first rotating shaft and the second rotating shaft to rotate, so as to switch the display screen between the first state and the second state.

17. The electronic device according to claim 1, wherein the non-display portion has a hole, and when the display screen is in the second state, the camera faces to the hole.

18. A photographing control method for an electronic device, the electronic device comprising a housing, a camera arranged in the housing, and a display screen movably disposed to the housing, and capable of being switched between a first state and a second state with respect to the housing, the display screen having a display portion and a non-display portion, the non-display portion being light transparent,
  wherein the photographing control method comprises:
  receiving a photographing preview instruction, the photographing preview instruction being configured to trigger the electronic device to control the display screen to switch from the first state to the second state and to trigger the camera to turn on image preview, wherein when the display screen is in the first state, the camera is covered by the display portion, and when the display screen is in the second state, the camera faces to the non-display portion, and configured to collect light through the non-display portion and performs imaging; and
  receiving a photographing instruction, the photographing instruction being configured to trigger the camera to collect light through the non-display portion of the display screen and perform imaging.

19. The photographing control method according to claim 18, further comprising:
  receiving a photographing end instruction, the photographing end instruction being configured to trigger the camera to turn off the image preview and to trigger the electronic device to control the display screen to switch from the second state to the first state.

20. An electronic device, comprising:
  a housing;
  a display screen disposed to the housing, movable with respect to the housing and capable of being switched between a first state and a second state, the display screen having a display portion and a non-display portion, the non-display portion being light transparent; and
  a camera arranged between the housing and the display screen, and configured to be covered by the display portion when the display screen is in the first state and to face to the non-display portion when the display screen is in the second state, and the camera being further configured to collect light through the non-display portion and perform imaging when the display screen is in the second state.

* * * * *